(12) United States Patent
Itoh

(10) Patent No.: US 9,201,211 B2
(45) Date of Patent: Dec. 1, 2015

(54) IMAGING DEVICE AND IMAGING METHOD FOR AUTOFOCUSING

(75) Inventor: Kei Itoh, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 207 days.

(21) Appl. No.: 13/513,263

(22) PCT Filed: Nov. 30, 2010

(86) PCT No.: PCT/JP2010/071774
§ 371 (c)(1),
(2), (4) Date: Jun. 1, 2012

(87) PCT Pub. No.: WO2011/068234
PCT Pub. Date: Jun. 9, 2011

(65) Prior Publication Data
US 2012/0236197 A1 Sep. 20, 2012

(30) Foreign Application Priority Data

Dec. 2, 2009 (JP) .................................. 2009-274606
Oct. 4, 2010 (JP) .................................. 2010-225096

(51) Int. Cl.
*G02B 7/10* (2006.01)
*G02B 7/36* (2006.01)
(Continued)

(52) U.S. Cl.
CPC *G02B 7/102* (2013.01); *G02B 7/36* (2013.01); *G03B 3/10* (2013.01); *G03B 13/36* (2013.01); *H04N 5/23212* (2013.01)

(58) Field of Classification Search
CPC . H04N 5/23245; H04N 5/347; H04N 5/3456; H04N 5/23212; H04N 5/2351; H04N 5/351; H04N 5/23293; H04N 5/23296; G02B 7/102; G02B 7/36; G03B 3/10; G03B 13/36

USPC ............. 348/222.1, 208.1, 333.03, 345–368, 348/208.12, 208.99
See application file for complete search history.

(56) References Cited

U.S. PATENT DOCUMENTS 5,212,513 A * 5/1993 Ishida et al. .................... 396/104
5,448,295 A * 9/1995 Hirota ............................ 348/345
(Continued)

FOREIGN PATENT DOCUMENTS

CN 1973231 A 5/2007
CN 101339348 A 1/2009
(Continued)

OTHER PUBLICATIONS

International Search Report Issued Mar. 15, 2011 in PCT/JP10/71774 Filed Nov. 30, 2010.
(Continued)

*Primary Examiner* — Pritham Prabhakher
(74) *Attorney, Agent, or Firm* — Oblon, McClelland, Maier & Neustadt, L.L.P.

(57) ABSTRACT

An imaging device includes an imaging lens which obtains an optical image of a subject, an imaging element which receives from a subject light passing through the imaging lens, a focus position determination unit which determines a focus position of the imaging lens according to image data obtained from the imaging element and a lens movement unit which moves the imaging lens, the focus position determination unit including an AF operation start position determination unit configured to calculate an AF evaluation value according to the image data, and determine an AF operation start position according to the AF evaluation value when the lens movement unit drives the imaging lens to a predetermined operation start position.

18 Claims, 18 Drawing Sheets

(51) Int. Cl.
*G03B 3/10* (2006.01)
*G03B 13/36* (2006.01)
*H04N 5/232* (2006.01)

(56) References Cited

U.S. PATENT DOCUMENTS

| | | |
|---|---|---|
| 6,430,368 B1 | 8/2002 | Hata |
| 7,298,413 B2* | 11/2007 | Kajiyama ............... 348/349 |
| 7,365,789 B2* | 4/2008 | Ogino .................. 348/345 |
| 7,486,330 B2* | 2/2009 | Sawachi ................ 348/345 |
| 7,577,351 B2* | 8/2009 | Pollard ................. 396/125 |
| 7,583,311 B2* | 9/2009 | Kuroki et al. .......... 348/353 |
| 7,702,232 B2* | 4/2010 | Yost et al. ............. 396/123 |
| 7,738,028 B2 | 6/2010 | Nakahara |
| 7,787,759 B2* | 8/2010 | Kawanami ............. 396/127 |
| 7,847,856 B2* | 12/2010 | Matsumoto ............ 348/357 |
| 8,243,191 B2* | 8/2012 | Uchida ................. 348/353 |
| 8,395,697 B2* | 3/2013 | Shikaumi .............. 348/353 |
| 8,451,366 B2* | 5/2013 | Nakano et al. ......... 348/335 |
| 2002/0018142 A1* | 2/2002 | Oda .................... 348/370 |
| 2002/0154241 A1* | 10/2002 | Ohkawara .............. 348/345 |
| 2004/0263633 A1* | 12/2004 | Shinohara et al. ...... 348/207.99 |
| 2005/0012846 A1* | 1/2005 | Shinohara ............. 348/345 |
| 2005/0254141 A1* | 11/2005 | Suzuki et al. .......... 359/696 |
| 2008/0007644 A1* | 1/2008 | Matsumoto ............ 348/345 |
| 2008/0031611 A1* | 2/2008 | Konishi ................ 396/102 |
| 2008/0151097 A1* | 6/2008 | Chen et al. ............ 348/349 |
| 2008/0240700 A1* | 10/2008 | Takagi ................. 396/98 |
| 2009/0028539 A1 | 1/2009 | Nakahara |
| 2009/0066830 A1* | 3/2009 | Fujii et al. ............ 348/345 |
| 2009/0086336 A1* | 4/2009 | Horiguchi et al. ...... 359/698 |
| 2009/0116830 A1* | 5/2009 | Kumagai .............. 396/125 |
| 2009/0185068 A1 | 7/2009 | Iwasaki |
| 2010/0128162 A1* | 5/2010 | Tanaka ................ 348/345 |
| 2010/0141801 A1* | 6/2010 | Okamoto et al. ....... 348/240.3 |
| 2010/0150538 A1* | 6/2010 | Ono et al. ............. 396/104 |

FOREIGN PATENT DOCUMENTS

| | | |
|---|---|---|
| JP | 39 5265 | 4/1964 |
| JP | 2000 180705 | 6/2000 |
| JP | 2005 24895 | 1/2005 |
| JP | 3851027 | 11/2006 |
| JP | 2008 58559 | 3/2008 |
| JP | 2009 25770 | 2/2009 |
| JP | 2009 31702 | 2/2009 |
| JP | 2009 175232 | 8/2009 |

OTHER PUBLICATIONS

Combined Office Action and Search Report issued Dec. 26, 2013 in Chinese Patent Application No. 201080061574.X (with English translation).

* cited by examiner

GRAPH A

GRAPH B

GRAPH A

FOCUS LENS POSITION

GRAPH B

FOCUS LENS POSITION

GRAPH A

1) PEAK DETECTION OF AF EVALUATION VALUE

GRAPH B

2) MONOTONIC DECREASE OF AF EVALUATION VALUES

GRAPH A

1) PEAK DETECTION OF AF EVALUATION VALUE

GRAPH B

2) MONOTONIC DECREASE OF AF EVALUATION VALUE

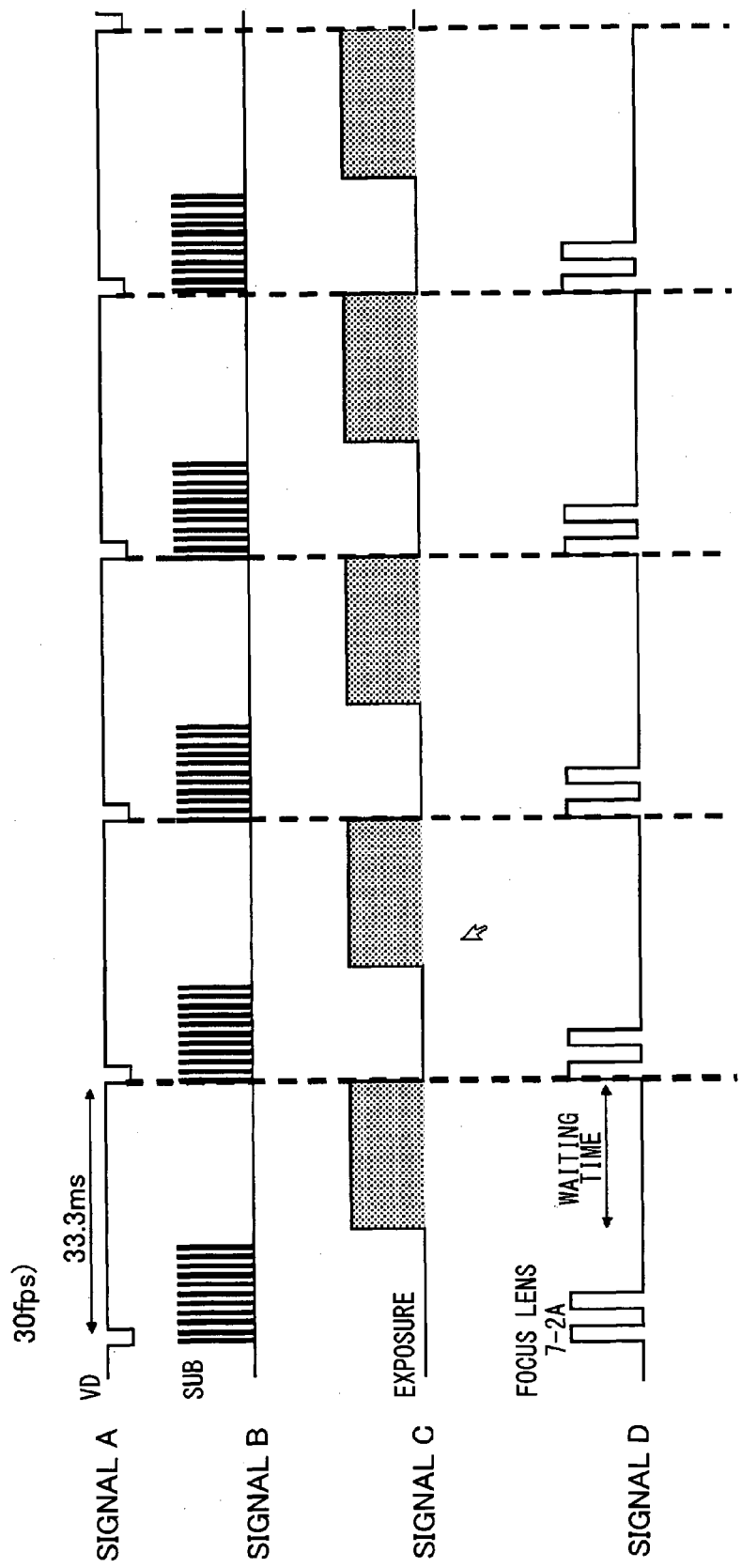

IMAGING DEVICE AND IMAGING METHOD FOR AUTOFOCUSING

TECHNICAL FIELD

The present invention relates to an imaging device having an autofocus function, and an imaging method. In particular, the present invention relates to an imaging device and an imaging method each of which can reduce a focus detection time by controlling a focusing operation start position of a lens unit even when an imaging device includes a lens unit having a wide driving range for focusing.

BACKGROUND ART

A general imaging device such as a digital still camera has an autofocus unit (hereinafter, AF unit) which automatically focuses on a subject. As an example of an autofocus control method for use in the AF unit, a hill-climbing auto-focus method is known (for example, refer to JP S39-5265A). In this hill-climbing auto-focus method, an integral value of a luminance difference of adjacent pixels is obtained from picture signals output from an imaging element, and this integral value is used as an AF evaluation value showing a focus level. The contoured part of the subject in picture signals is clear when a subject is in a focus state, so that the luminance difference of the adjacent pixels in the picture signals is increased. Namely, the AF evaluation value is increased in a focus state. On the other hand, the contoured part of the subject is not clear when the subject is in a non-focus state, so that the luminance difference of the adjacent pixels in the picture signals is reduced. Namely, the AF evaluation value is reduced in a non-focus state.

In the AF unit, while moving a focus lens, an AF evaluation value is calculated by obtaining a picture signal at a predetermined timing or constant time intervals in a lens position at that time, the maximum value of the AF evaluation values (the peak position of the AF evaluation values) is specified, the focus lens is moved to the lens position where the AF evaluation value is the maximum value, and then the focus lens is stopped. Accordingly, the AF unit is configured to automatically focus on the subject. As described above, the hill-climbing auto-focus method focuses on a subject by detecting a peak position of the AF evaluation values.

In a conventional general hill-climbing auto-focus method, a lens position which can obtain the maximum AF evaluation value is specified by moving the lens over a predetermined entire movement range of the focus lens, and the focus lens is moved to the specified position. More specifically, an AF operation start position is used as the central position of the predetermined movement range of the focus lens, and the focus lens is firstly moved to that position. After moving the focus lens from that position to a certain direction, for example, the direction of the nearest focus position, the focus lens is turned over and is moved to the direction of the infinity focus position. During this time, the lens position which can obtain the maximum AF evaluation value is specified. However, according to such an AF control method, it takes a long time for the AF operation, and a photo opportunity may be missed.

In order to address such a problem, recently, an AF control method which improves a hill-climbing auto-focus method, and operates with high accuracy and at high speed has been proposed in JP3851027B, for example. The AF control method described in JP3851027B is a method which can increase an AF operation speed and can smoothly focus on a subject by using both of a first mode which samples AF evaluation values at minute intervals and a second mode which samples AF evaluation values at rough intervals until a focus lens comes closer to the focus position, and samples AF evaluation values at minute intervals near the focus position. However, in the AF control method described in JP3851027B, since the two AF controls such as the AF control at rough intervals and the AF control at minute intervals are performed, the increase in the speed of the focus operation is insufficient. For this reason, an increase in the speed of the focus operation is still desired.

Consequently, a focus adjuster described in JP2008-058559A is proposed. This focus adjuster is configured to store, after once focusing, when readjusting a focal point, an image in the last focus position, compare this stored image to a present image, and narrow a focus search range if the agreement is within a predetermined range. However, in the focus adjuster described in JP2008-058559A, it is premised that a once focused image is stored, and it does not follow a change in a subject over time. For this reason, if the subject is changed over time, the feature described in JP2008-058559A is more likely to be unused, so that the virtual effects can not be expected.

Additionally, all of the conventional autofocus adjusters have a problem in that a heavy lens has low stop accuracy in a focus position, has lack of movement by a driving pulse and requires time for movement or sometimes does not move. In particular, if a driving mechanism portion of a lens driving system has backlash, or a focus lens has a wide driving range such as a lens which can perform macro photography, the above problem is apparent.

SUMMARY OF THE INVENTION

In view of the above described conventional arts, there has been desired a technique which can smoothly move a lens to a focus position by estimating a focus position of a subject even if a lens is located in any position of a moving range.

It is, therefore, an object of the present invention to provide an imaging device and an imaging method each of which can perform an AF operation at high speed by calculating AF evaluation values while moving a shooting lens to an AF operation start position in an AF operation.

In order to achieve the above object, one embodiment of the present invention provides an imaging device including an imaging lens which obtains an optical image of a subject, an imaging element which receives from a subject light passing through the imaging lens, a focus position determination unit which determines a focus position of the imaging lens according to image data obtained from the imaging element and a lens movement unit which moves the imaging lens, the focus position determination unit including an AF operation start position determination unit configured to calculate an AF evaluation value according to the image data, and determine an AF operation start position according to the AF evaluation value when the lens movement unit drives the imaging lens to a predetermined operation start position.

Also, one embodiment of the present invention provides an imaging method including an imaging step which receives an optical image of a subject and images the optical image of the subject, a focus position determination step which determines a focus position of an imaging lens according to image data obtained in the imaging step and a movement step which moves the imaging lens, the focus position determination step including an AF operation start position determination step which calculates an AF evaluation value based on the image data and determines the AF operation start position based on the AF evaluation value when the lens movement step drives the imaging lens to a predetermined operation start position.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 20 provides a timing chart illustrating a VD signal in loading of image data, driving timing of a focus lens, pulse timing for removing of electric charge of an electric shutter and exposure timing.

DETAILED DESCRIPTION OF THE PREFERRED EMBODIMENTS

Hereinafter, an embodiment of an imaging device and an imaging method according to the present invention will be described with reference to the drawings.

Figure 1:
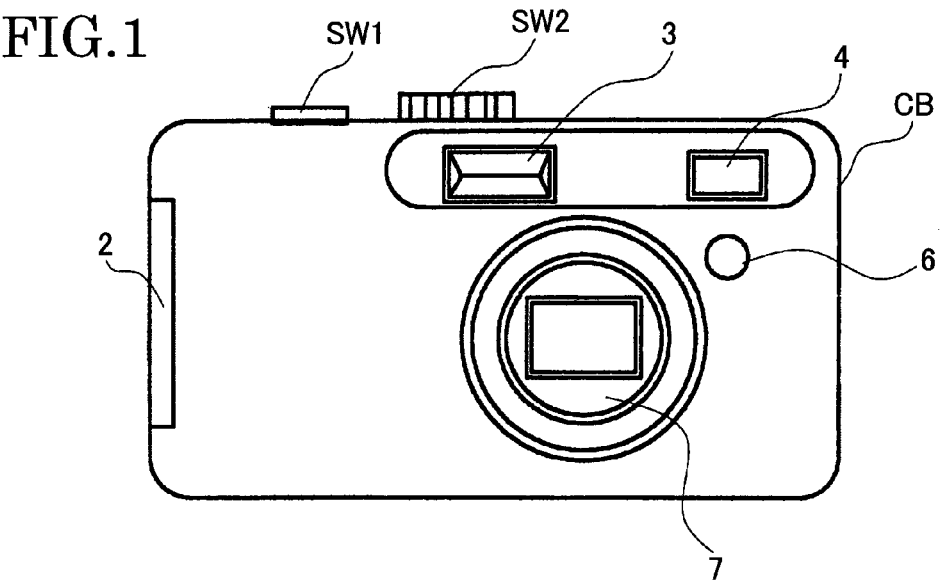
FIG. 1 provides a front view illustrating an example of a digital camera which is an imaging device according to an embodiment of the present invention.
Figure 2:
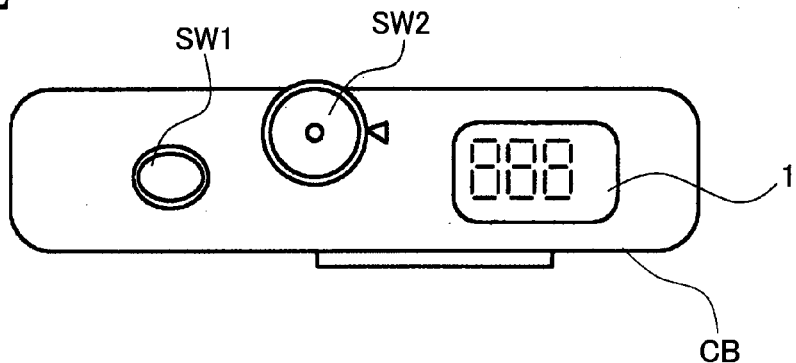
FIG. 2 provides a plan view of the digital camera in FIG. 1.
Figure 3:
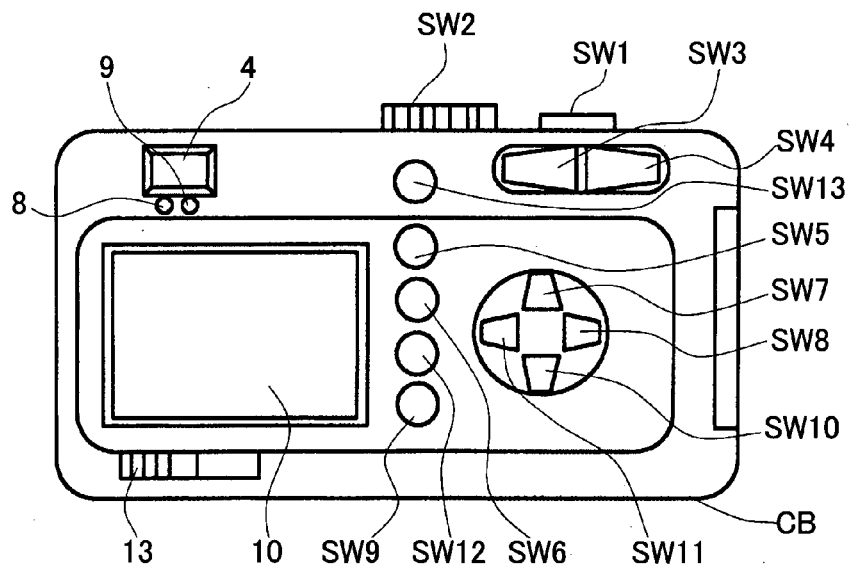
FIG. 3 provides a back view of the digital camera in FIG. 1.

FIGS. 1-3 provide examples of external appearances of a digital camera which is an example of an imaging device according to the embodiment of the present invention. FIG. 1 provides a front view, FIG. 2 provides a plan view and FIG. 3 provides a back view.

Referring to FIG. 1, a front face of a camera body CB which is a case of an imaging device includes a strobe light emitter 3, an object plane of an optical finder 4, a remote control receiver 6 and a lens barrel unit 7 including an imaging lens. One side face of the camera body CB includes a lid 2 of a memory card room and a battery room.

Referring to FIG. 2, a top face of the camera body CB includes a shutter button SW1, a mode dial SW2 and a sub liquid crystal display 1 (sub-LCD) (hereinafter, LCD).

Referring to FIG. 3, a back side of the camera body CB includes an eyepiece section of the optical finder 4, an AF light-emitting diode 8 (hereinafter, LED), a strobe LED 9, an LCD 10, a power source switch 13, a zoom switch SW3 in a wide angle direction, a zoom switch SW4 in a telephoto direction, a switch SW5 for setting and releasing a self timer, a menu switch SW6, a switch 7 for setting strobe light and up movement of a cursor, a switch SW8 for right movement of a cursor, a display switch SW9, a switch SW10 for macro and down movement of a cursor, a switch SW11 for confirming an image and left movement of a cursor, an OK switch SW12 and a quick access switch SW13.

Figure 4:
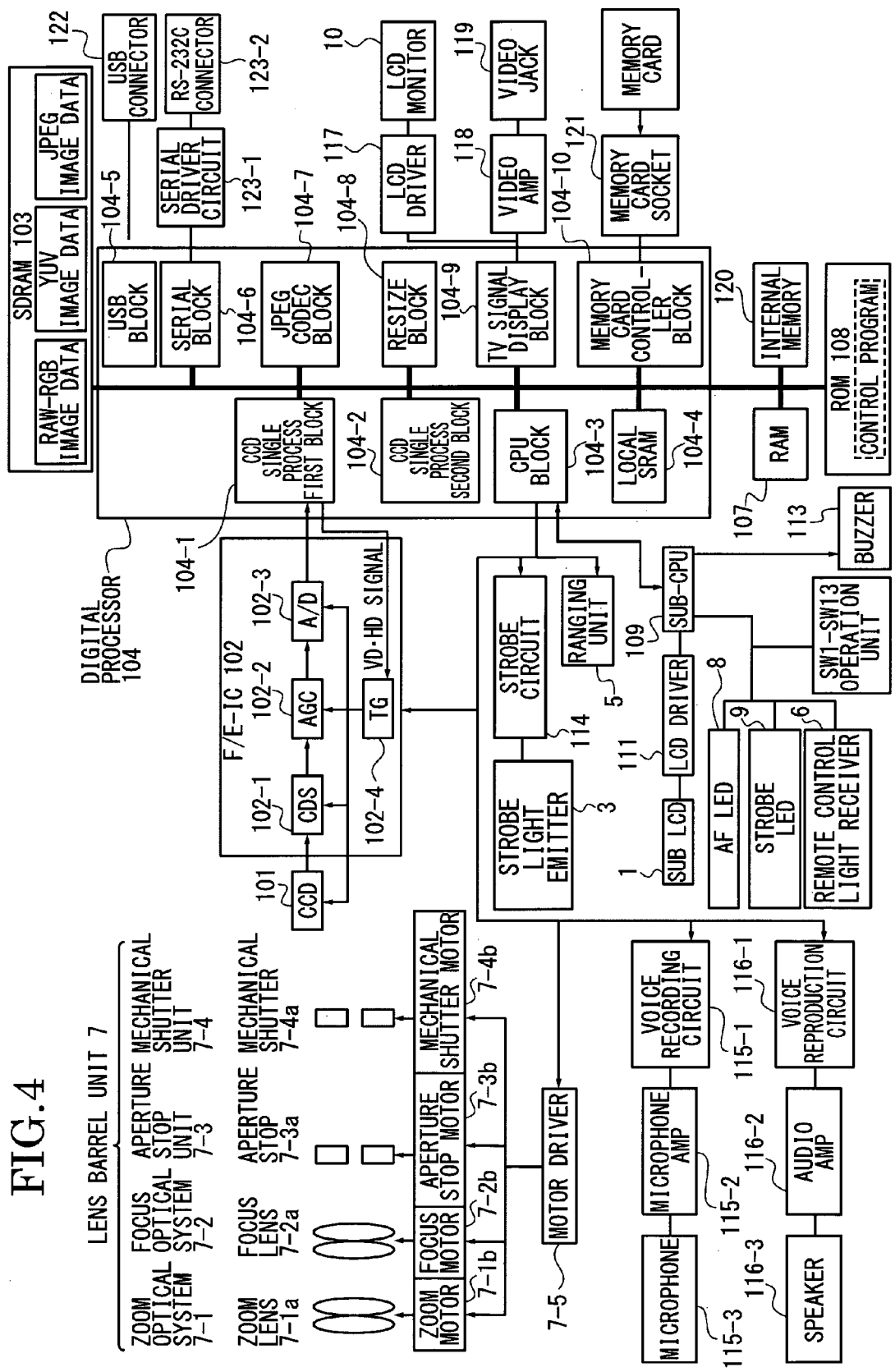
FIG. 4 provides a block diagram illustrating an example of an electric control system of the digital camera in FIG. 1.

Next, an example of a functional block of an imaging device according to the embodiment illustrated in FIG. 4 will be described. Various operations (processes) of the imaging device are controlled by a digital signal processor 104 (hereinafter, DSP 104) configured as an IC (integrated circuit) and the like. The DSP 104 includes a CCD (charge-coupled device) signal process first block 104-1, a CCD signal process second block 104-2, a CPU (central process unit) block 104-3, a local SRAM (static random access memory) 104-4, a USB (universal serial bus) block 104-5, a serial block 104-6, a JPEG codec (CODEC) block 104-7, a resize (RESIZE) block 104-8, a TV signal display block 104-9 and a memory card controller block 104-10. Each block is connected via a bus line. This DSP 104 functions as an autofocus detector, a lens movement unit and an AF operation start position determination unit.

The external portion of the DSP 104 includes a SDRAM (synchronous random access memory) 103 which stores RAW-RGB image data, YUV image data and JPEG image data, a RAM 107, an internal memory 120 and a ROM 108 in which a control program is stored. These are connected to the DSP 104 via bus lines.

The lens barrel unit 7 includes a zoom optical system 7-1 having a zoom lens 7-1a, a focus optical system 7-2 having a focus lens 7-2a, an aperture stop unit 7-3 having an aperture stop 7-3a and a mechanical shutter unit 7-4 having a mechanical shutter 7-4a. The zoom optical system 7-1, the focus optical system 7-2, the aperture stop unit 7-3 and the mechanical shutter unit 7-4 are driven by a zoom motor 7-1b, a focus motor 7-2b as a focus lens moving section, an aperture stop motor 7-3b and a mechanical shutter motor 7-4b, respectively. These zoom motor 7-1b, the focus motor 7-2b, the aperture stop motor 7-3b and the mechanical shutter motor 7-4b are driven by a motor driver 7-5, and the motor drive 7-5 is controlled by a CPU block 104-3 of the DSP 104.

The zoom lens 7-1a and the focus lens 7-2a of the lens barrel unit 7 constitutes an imaging lens for focusing a subject optical image on an imaging face of the CCD 101 which is an imaging element. The CCD 101 converts the subject optical image into electrical image signals, and outputs the electric signals to an F/E-IC (front end IC) 102. The E/F-IC 102 includes a CDS (correlation double sampling section) 102-1, an AGC (automatic gain controller) 102-2 and an A/D (analogue digital) converter 102-3, performs a predetermined process on each image signal, converts the image signals into digital signals, and outputs the digital signals to the CCD signal first processing block 104-1 of the DSP 104. These signal processing operations are controlled via a TG (timing generator) 102-4 by VD-HD (vertical driving and horizontal driving) signals output from the CCD signal first processing block 104-1 of the DSP 104. The CCD signal first processing block 104-1 performs signal processes such as white balance adjustment and γ adjustment on digital image data input via the F/E-IC 102 from the CCD 101, and outputs the VD signals and HD signals.

The CPU block 104-3 of the DSP 104 controls a voice recording circuit 115-1 which performs a voice recording operation. This voice recording circuit 115-1 records a voice signal which is converted by a microphone 115-3 and is amplified by a microphone amplifier 115-2 according to the instruction of the CPU block 104-3. The CPU block 104-3 controls a voice reproduction circuit 116-1. The voice reproduction circuit 116-1 outputs a voice signal recorded in a memory to an audio amplifier 116-2 by the instruction of the CPU block 104-3. This voice signal is amplified by the audio amplifier 116-2 and is output to a speaker 116-3, and a voice is reproduced, from the speaker 116-3. The CPU block 104-3 emits illumination light from the strobe light emitter 3 by controlling a strobe circuit 114. The CPU block 104-3 controls a ranging unit 5 which measures a subject distance.

In addition, since the imaging device performs an AF control according to image data as described below, it is not always necessary to measure a subject distance by the ranging unit 5, in this case, the ranging unit 5 can be omitted. By the ranging unit 5, the measurement information of the subject distance may be used for controlling the strobe light emitting in the strobe circuit 114. Also, the measurement information of the subject distance by the ranging unit 5 may be supplementarily used in the focus control according to the image data.

The CPU block 104-3 is electrically connected to a sub CPU 109 disposed outside the DSP 104. The sub CPU 109 controls the display by the sub LCD 1 via an LCD driver 111. The sub CPU 109 is electrically connected to an AF LED 8, the strobe LED 9, the remote control light receiver 6, the operation section having the switches SW1-SW13 and the buzzer 113.

A USB block 104-5 is electrically connected to a USB connector 122. The serial block 104-6 is electrically connected to an RS-232C connector 123-2 via a serial driver circuit 123-1. The TV signal display block 104-9 is electrically connected to the LCD 10 via an LCD driver 117. The TV signal display block 104-9 is electrically connected to a video jack 119 via a video amplifier 118. The memory card controller block 104-10 is electrically connected to a contact point of a memory card socket 121. If a memory card is provided in this memory card socket 121, the memory card is electrically connected to the contact point of the card, and the memory card controller block 104-10 is electrically connected to the memory card.

Next, the operation of the imaging device constructed as described above will be described. By setting the mode dial SW 2 illustrated in FIGS. 1-3 to a recording mode, the imaging device is activated in the recording mode. If the CPU block 104-3 detects via the sub CPU 109 that the recoding mode by the mode dial SW2 included in the operation section (SW1-SW13) in FIG. 4 is turned on, the recording mode by the mode dial SW2 is set. Then, the CPU block 104-3 controls the motor driver 7-5, and moves the lens barrel unit 7 to a shootable position. Moreover, the CPU block 104-3 turns each section such as the CCD 101, the F/E-IC 102 and the LCD monitor 10 on, and starts the operation of each section. If each section is turned on, the operation of the finder mode is started.

In the finder mode, by the light entered into the CCD 101 which is the imaging element from the subject via the imaging lens of the lens barrel unit 7, the subject image is focused on the light-receiving face of the CCD 101. The subject image is converted into an electric signal by the CCD 101, and is output to the CDS 102-1 as the analogue signal of RGB. The analogue signal of RGB is sent to the A/D convertor 102-3 via the AGC (automatic gain control circuit) 102-2. This analogue signal of RGB is converted into the digital signal of RGB (RGB image data) by the A/D convertor 102-3. This RGB image data is converted into the YUV image data in the YUV convertor provided in the CCD signal second processing block 104-2 in the DSP 104. This YUV image data is recorded in the SDRAM 103 as a frame memory. The CCD signal second processing block 104-2 performs an appropriate process such as a filtering process on the RGB image data, and converts the RGB image data into the YUV image data. This YUV image data is read by the CPU block 104-3. The read YUV image data is output to a TV (television) via the TV signal display block 104-9, the video amplifier 118 and the video jack 119. Also, the read YUV image data is output to the LCD 10 via the LCD driver 117. This process is performed at 1/30 second intervals and becomes a display in the finder mode in which an image to be displayed on the TV or the LCD 10 is updated every 1/30 second.

If the shutter button SW1 of the operation section is pressed, AF evaluation values showing a focus level in at least a part of a screen and AF evaluation values showing the exposure level are calculated according to the RGB image data loaded in the CCD signal first processing block 104-1. The AF evaluation values are read by the CPU block 104-3, and are used for a focus detection process (AF process) by the autofocus detector.

The focused subject image is clear in the edge portion thereof, so that a high frequency component of a space frequency included in the image data becomes the maximum. The AF evaluation values which are calculated by using the subject image data are set to be values which reflect the level of the high frequency component of the space frequency included in the image data. Therefore, the position of the focus lens 7-2a which obtains image data in which this AF evaluation value becomes the maximum value becomes a focus position. Namely, according to the AF evaluation value, the focus position can be specified. In addition, when a plurality of positions (peak positions) of the focus lens 7-2a in which the AF evaluation value becomes the maximum value exists, an AF operation which uses the most reliable peak position as a focus position is performed in view of the size of the AF evaluation value in the peak position and the level of the change (increase and decrease) of the AF evaluation value in the position around the peak position.

Figure 5:
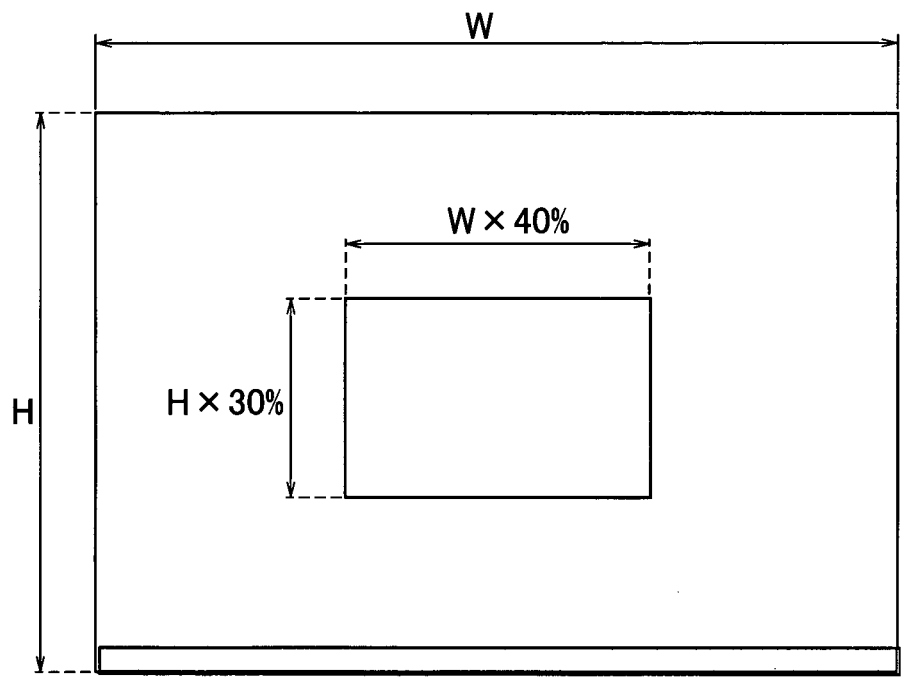
FIG. 5 provides a view illustrating a general AF frame which is displayed on an LCD of the digital camera in FIG. 1.

The AF evaluation value can be calculated from the RGB image data in a predetermined range (AF process area) in a subject image. FIG. 5 illustrates an image displayed on the LCD 10 in the finder mode. In FIG. 5, the inside portion of the frame displayed in the central portion of the LCD 10 is the AF process area in the imaging device. For example, the area of 40% of the length in the horizontal direction and 30% of the length in the vertical direction in the center of the subject image is set as the example of this AF process area.

Next, the relationship between the driving timing of the focus lens 7-2a and the AF evaluation value calculation timing in the AF process will be described. The driving of the focus lens 7-2a is performed by a predetermined focus driving amount corresponding to one VD signal. When the focus motor 7-2b is a pulse motor, for example, the number of driving pulses corresponds to the focus driving amount. By driving the focus lens 7-2a according to a predetermined number of driving pulses at a predetermined pulse rate corresponding to the falling edge of the VD signal pulse, one driving of the focus lens 7-2a is completed. Predefined driving of the focus lens 7-2a is again performed corresponding to the falling edge of the VD signal to be output next. As described above, the driving of the focus lens 7-2a is performed while being synchronized to the VD signal (i.e., frame period).

FIG. 20 is a timing chart illustrating a VD signal, focus driving timing of the focus lens 7-2a, timing of an electric charge removing pulse (SUB) in an electric shutter and exposure timing when shooting a subject image at a 30 fps frame rate. In FIG. 20, if one VD signal is generated (refer to Signal A in FIG. 20), two pulses (refer to Signal D in FIG. 20) which drive the focus lens 7-2a are generated by the VD signal. The focus lens 7-2a is driven according to the driving amount corresponding to the two driving pulses, and the focus lens 7-2a is moved. By the VD signal, a predetermined number of electric charge removing pulses (SUB) is generated (refer to Signal B in FIG. 20), and the removing process of the electric charge in the CCD 101 is performed according to the number of SUBs. After the electric charge removing process is completed, the exposure process is performed (refer to Signal C in FIG. 20). By the exposure process, the subject image is loaded as the RGB image data. The AF evaluation value is calculated according to this RGB image data. The number of driving pulses is changeable, and is changed according to a focal length, the extending amount of the focus lens (focus lens driving range) and the like. As described above, the AF process in this embodiment is performed within the driving range of the focus lens 7-2a while being synchronized to a VD signal.

Embodiment 1

Next, Embodiment 1 of an imaging device and an imaging method by the imaging device will be described. At first, the AF operation when the shutter button SW 1 is pressed will be described by using the flow chart in FIG. 6. First of all, in the AF operation when the shutter button SW1 is pressed, it is confirmed whether the shutter button SW1 is pressed or not (6-1). If the shutter button SW1 is pressed, a focus lens start scanning process (6-2) is conducted. This process is one of the features of the present embodiment, so the focus lens start scanning process will be described in detail by using the flow chart in FIG. 7.

Figure 7:
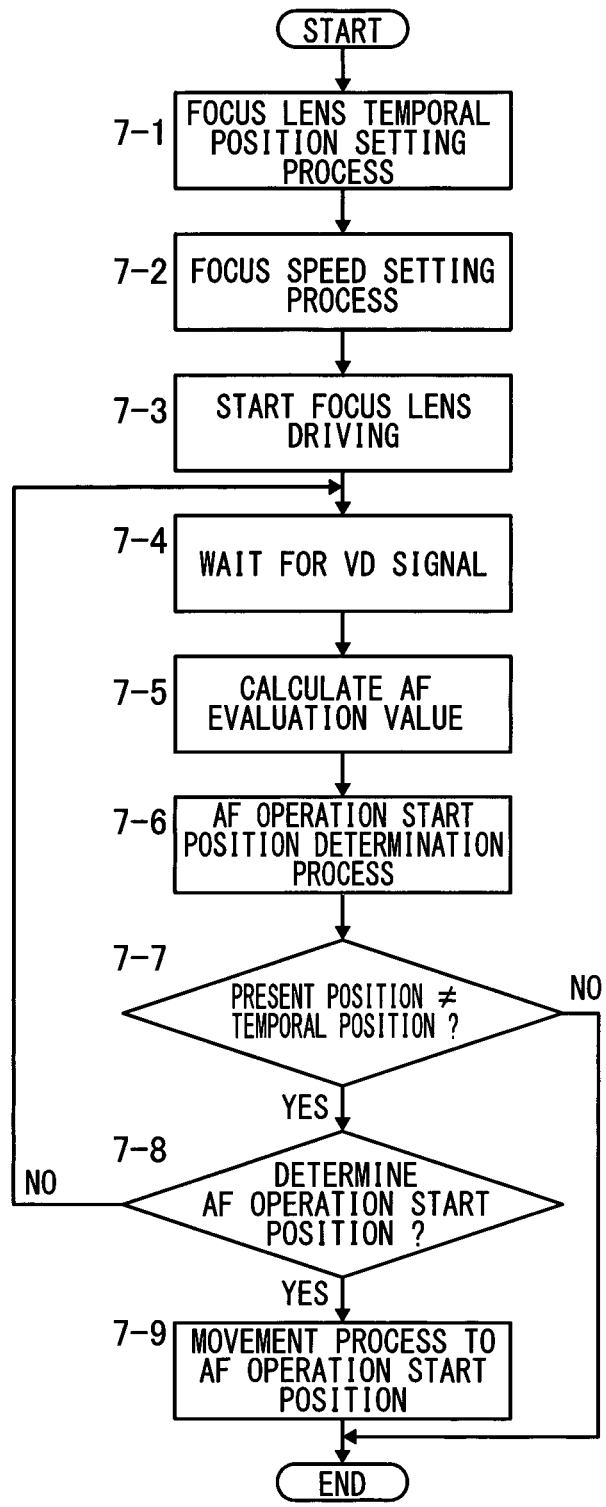
FIG. 7 provides a flow chart of a focus lens start scanning process in Embodiment 1 of the imaging device according to the present invention.

Referring now to FIG. 7, in the focus lens start scanning process, at first, a focus lens temporal position setting process is performed (7-1). The temporal position is a position of the focus lens 7-2a in the previous stage, which determines the position (AF operation start position) of the focus lens 7-2a starting the AF operation, and is a predetermined operation start position. When conducting the subsequent AF process, as the moving direction of the focus lens 7-2a, the direction which is not affected by the backlash of the driving mechanism of the focus lens 7-2a or the direction which does not require the removing of the backlash is preferable. Since the moving direction of the focus lens 7-2a in this embodiment is a direction toward the infinity side from the close range side, the driving direction of the focus lens 7-2a in the subsequent AF process is the close range side→the infinity side direction. Therefore, in the present embodiment, the temporal position is required to be located in the close range side, so that the temporal position is set in the position of the focus lens which focuses on the subject in a position of 30 cm which is the position of the close range side.

Figure 8:
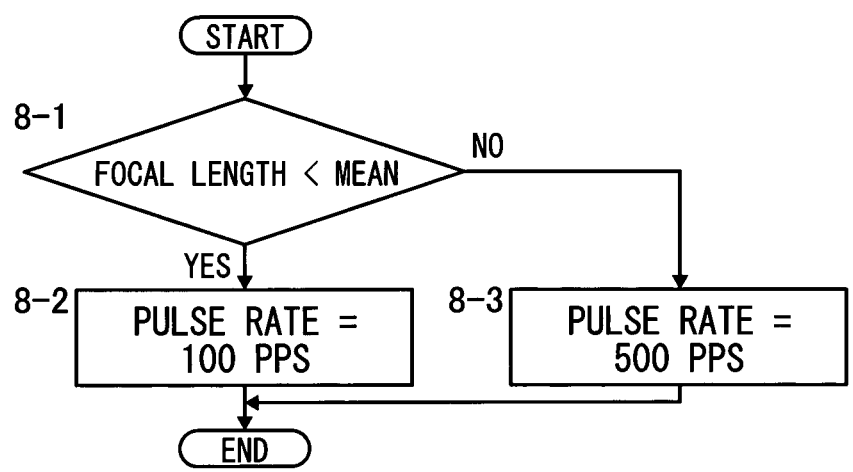
FIG. 8 provides a flow chart of a focus lens speed setting process in Embodiment 1.

Next, a focus lens speed setting process is performed (7-2). In the focus lens speed setting process, the focus lens speed setting is performed according to the calculation intervals of the AF evaluation values. Since the frame rate in the finder mode of the imaging device of the present embodiment is 30 fps, the focus lens is set to a speed which is necessary for calculating the AF evaluation values at 1/30 (sec) intervals. FIG. 8 illustrates the flow chart of the focus lens speed setting process. In FIG. 8, the focus lens speed (pulse rate) is set according to the focal length. It is determined whether the focal length is less than a predetermined value (Mean) or not (8-1), and if the focal length is less than a predetermined value, the pulse rate is set to 100 pps (8-2). On the other hand, if the focal length is a predetermined value or more, the pulse rate is set to 500 pps (8-3). Regarding the value of this pulse rate, if the focus lens position is in the close range side, it is preferable for the pulse rate to be changeable corresponding to the position of the focus lens, for example, to increase the pulse rate. The above focal length is considered when performing the focus lens speed setting process because a lens having a zoom function is assumed. If a single focus lens barrel unit is used, the pulse rate can be fixed to 100 pps, for example. In the present embodiment, the above predetermined value (Mean) assumes 80 mm in 35 mm film equivalent.

Going back to FIG. 7, next, the driving of the focus lens is started (7-3). After starting the driving of the focus lens, the VD signal is put on hold (7-4), and the subject image is shot with respect to each VD signal. Then, based on the RGB image data of this subject image, the AF evaluation value is calculated (7-5). Namely, the focus lens is moved to a predetermined direction while being synchronized to the VD signal, and the AF evaluation value is calculated. As described above, by calculating the AF evaluation value with respect to each position of the focus lens, after determining the AF operation start position based on the AF evaluation value, the focus lens can be moved to that position.

Figure 9:
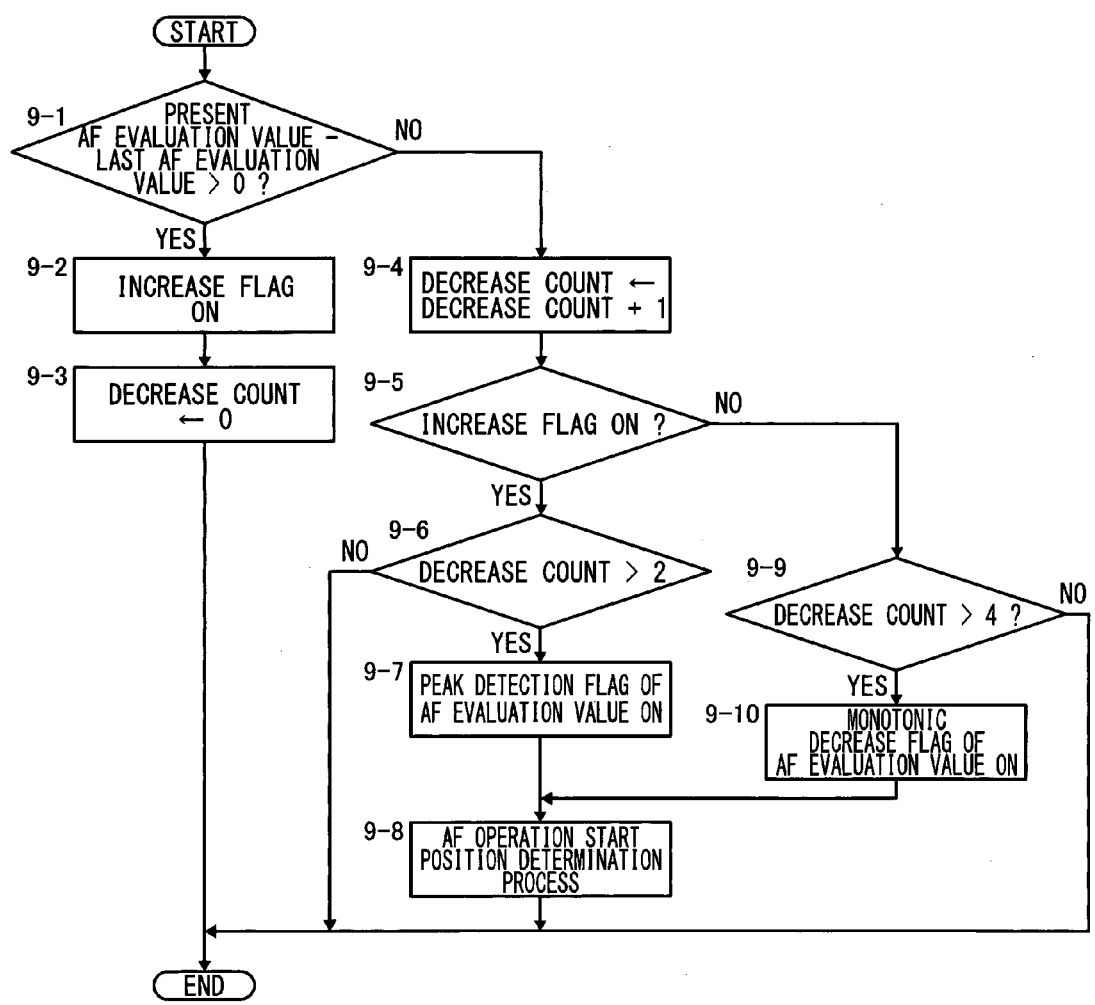
FIG. 9 provides a flow chart of an AF operation start position determination process in Embodiment 1.

Next, the AF operation start position determination process is performed (7-6). A specific example of the AF operation start position determination process (7-6) is described by using the flow chart in FIG. 9. At first, a difference between the present AF evaluation value and the previous AF evaluation value is calculated. Then, it is determined whether this difference is 0 or more (9-1). If this difference is larger than 0, it is determined that the AF evaluation value is increased, and the increase flag becomes ON (9-2). At the same time, the decrease count is reset to 0 (9-3), then, the focus lens driving start position determination process is completed. On the other hand, if this difference is less than 0, it is determined that the AF evaluation value is decreased, and 1 is added to the decrease count (9-4). Next, it is determined whether the increase flag is ON or not (9-5). If the increase flag is ON, i.e., if the AF evaluation value is decreased after the AF evaluation value is increased, it is determined that the peak of the AF evaluation values is detected when the number of decrease counts is larger than 2 (9-6), and the peak detection flag of the AF evaluation value becomes ON (9-7). If the increase flag is not ON in the step of 9-5, it is determined whether the decrease count is larger than 4 or not (9-9). If the decrease count is larger than 4, it is determined that the AF evaluation value becomes the monotonic decrease state because the AF evaluation value has already passed the peak. As described above, after the peak detection flag of the AF evaluation value becomes ON or the monotonic decrease flag becomes ON, the AF operation start position determination process is conducted (9-8).

Figure 13:
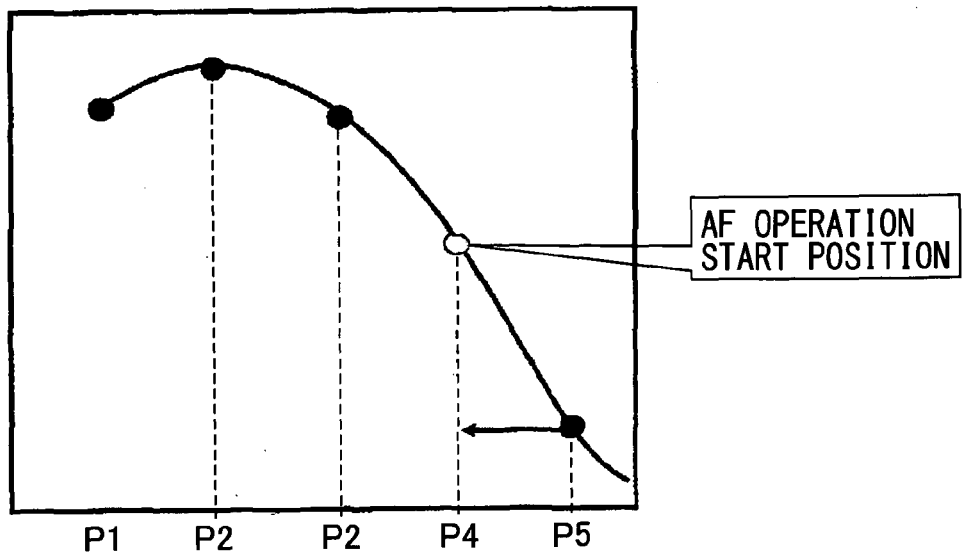
FIG. 13 provides graphs each illustrating AF evaluation values in focus lens start scanning in Embodiment 1; Graph A illustrates peak detection of AF evaluation values and Graph B illustrates monotonic decrease of AF evaluation values.
Figure 13:
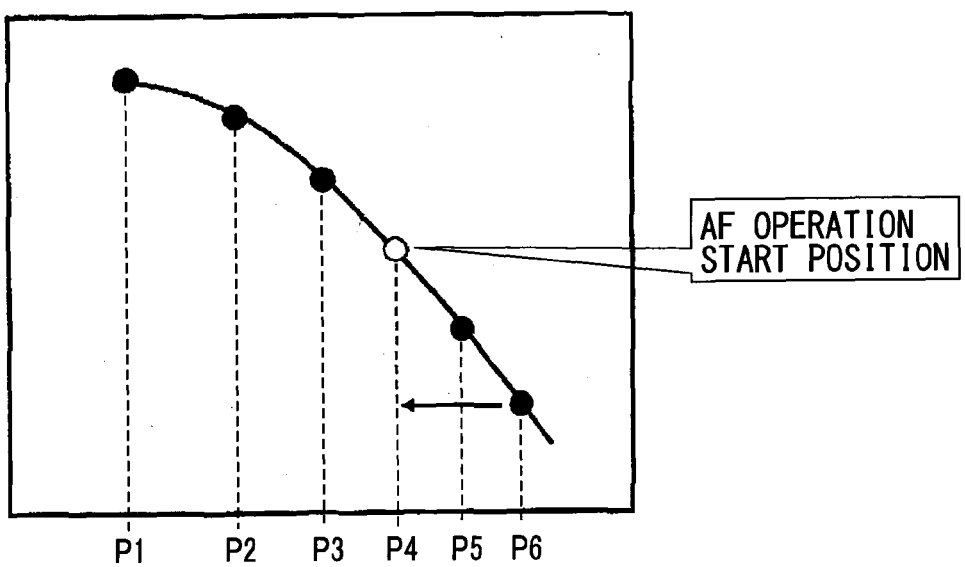

Regarding the AF operation start position determination process, if the peak detection flag of the AF evaluation value is ON, the position where the last AF evaluation value is calculated is set to the AF operation start position. Moreover, if the monotonic decrease flag is ON, the position where the last AF evaluation value but one is calculated is set to the AF operation start position. Graph A of FIG. 13 illustrates an AF operation waveform in the peak detection of the AF operation and Graph B of FIG. 13 illustrates an AF operation waveform in the monotonic decrease of the AF operation. In each of the graphs, the position illustrated by the white circle is a start position. In the focus lens start scanning process, since the movement accuracy of the focus lens is affected by the backlash of the driving mechanism of the focus lens, if the focus position is determined in this start scanning process, a problem regarding focus detection accuracy develops. In this embodiment, the focus lens start scanning process is only to determine the AF operation start position which is a next process, and the focus position is separately determined, so that focus accuracy can be improved.

Going back to FIG. 7, after determining the AF operation start position (7-6), it is determined whether the present position reaches the temporal position (7-7) or not. If the present position does not reach the temporal position yet (YES in 7-7), the AF operation start position determination process is further performed (7-8). In this case, if the AF operation start position is determined, i.e., the peak detection flag is ON or the monotonic decrease flag is ON, the movement process to the AF operation start position (7-9) is performed, and the focus lens start scanning process is completed. In the movement process to the AF operation start position (7-9), while the focus lens 7-2a still moves in the beginning of the process, the stop operation of the focus lens 7-2a is performed, and the movement of the focus lens 7-2a to the AF operation start position is again started. On the other hand, if the focus lens 7-2a is stopped in the beginning of the process, the movement of the focus lens 7-2a to the AF operation start position is started. If the AF operation start position is not determined (NO in 7-8), the VD signal is again put on hold, the AF evaluation value is calculated, and the AF operation start position determination process is repeated. In the step of 7-7, if the present position of the focus lens 7-2a=the temporal position (NO in 7-7), in the movement process to the AF operation start position (7-9), the temporal position is set as the AF operation start position, and the focus lens start scanning process is completed. The above-described focus lens start scanning process is a feature of the present invention.

Figure 6:
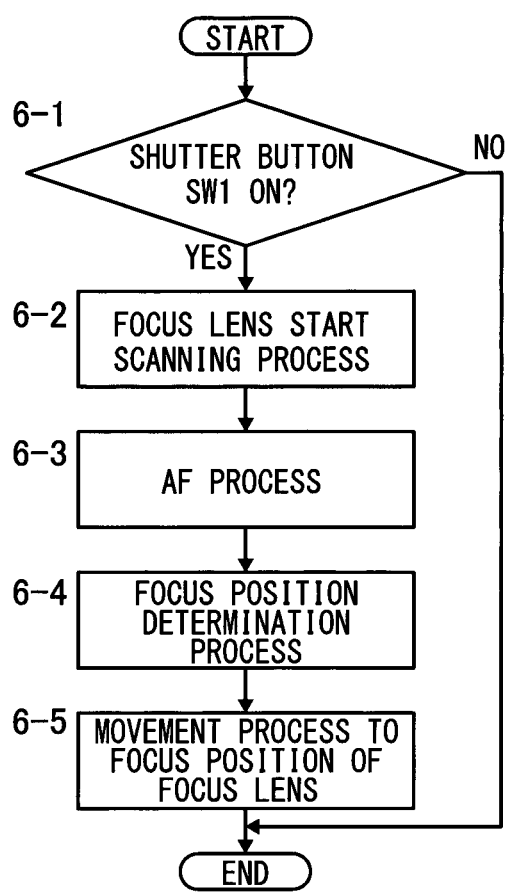
FIG. 6 provides a flow chart illustrating the AF operation of the digital camera in FIG. 1.
Figure 10:
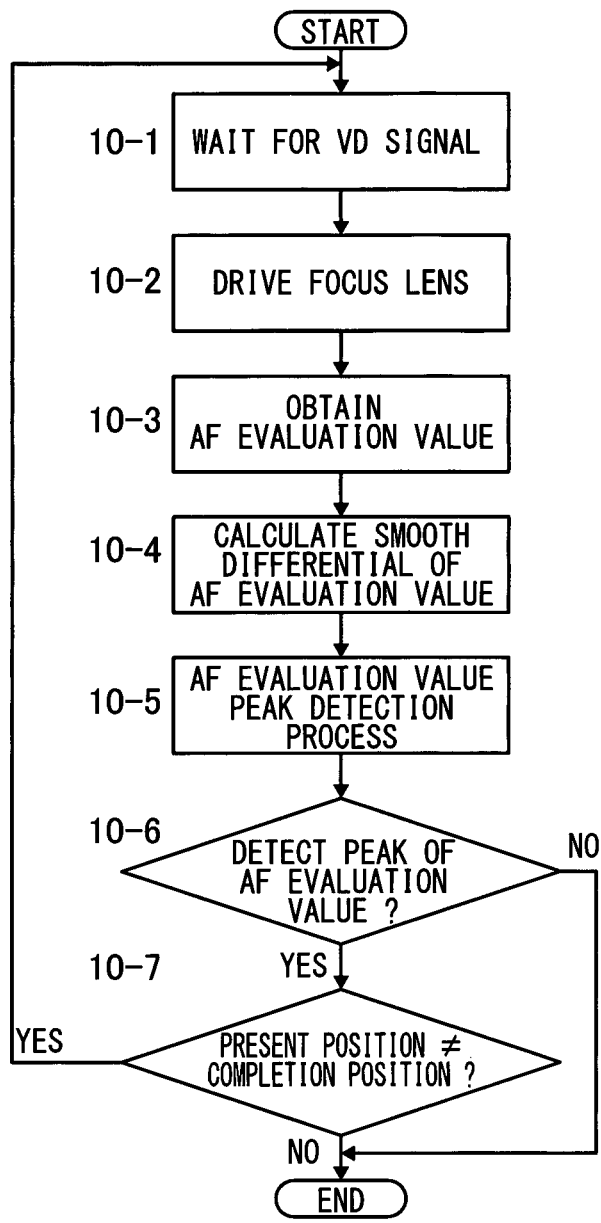
FIG. 10 provides a flow chart of an AF process in Embodiment 1.

After performing the above processes, the AF process illustrated in the flow chart in FIG. 6 is performed (6-3). A specific example of the AF process is illustrated in FIG. 10. In FIG. 10, at first, the flow waits unit the falling edge of the VD signal is detected (by CPU block 104-3) (10-1). After the falling edge of the VD signal is detected, the focus motor 7-2b is driven according to the predetermined number of pulses, and the focus lens 7-2a is moved (10-2). After the focus lens 7-2a is moved, a picture signal is obtained. By the RGB image data according to the picture signal, the AF evaluation value is calculated (10-3). Then, a smooth differential calculation process (10-4) of the AF evaluation value is performed. As for the smooth differential calculation process of the AF evaluation value, where the calculated AF evaluation value is X [0], the AF evaluation value obtained before a-number than X [0] is X [−a], the AF evaluation value obtained after a-number than X [0] is X [a], and the weight coefficient to each AF evaluation value is b1, b2, . . . , the smooth differential value Y [0] can be obtained by Y [0]=Σ[i=0→a] (X[i]−X[−i])×bi.

The specific example of the above smooth differential calculation equation is illustrated. When obtaining the smooth differential value Y [0] by using the three evaluation values in the vicinity of the present AF evaluation value (X [0]), the following equation is used.

$$Y[0]=(X[-1]-X[1])\times 1+(X[-2]-X[-2])\times 2+(X[-3]-X[3])\times 3$$

Regarding the weight coefficient (bi=1, 2, 3 . . . ), an AF evaluation value (for example, X [1]) close to the present AF evaluation value X [0] is a small coefficient and a far AF evaluation value (for example, X [3]) is a large coefficient. More specifically, regarding the weight coefficient, if the correlation degree with the present value (X [0]) is small, a large value is used. In addition, the specific coefficient values are not limited to the above example.

As described above, by obtaining the above smooth differential value based on the relativity of the AF evaluation values which are calculated according to the movement of the focus lens 7-2a, the peak of the AF evaluation values is specified, and the focus position is determined. In addition, the above equation is used to calculate the smooth differential by using the three evaluation values, but the number of AF evaluation values for use in this calculation is not limited to three.

Since a plurality of AF evaluation values is required in order to obtain smooth differential value, in the AF evaluation value obtaining timing just after the beginning of the AF operation or just before the driving completion range of the focus lens 7-2a, the smooth differential calculation can not be performed. Accordingly, after the beginning of the AF process, the smooth differential calculation process is started after the AF evaluation values which can perform the smooth differential calculation are calculated. Also, by calculating the AF evaluation value required for the smooth differential calculation by interpolating with the already obtained AF evaluation value, the smooth differential calculation process is preformed.

Figure 11:
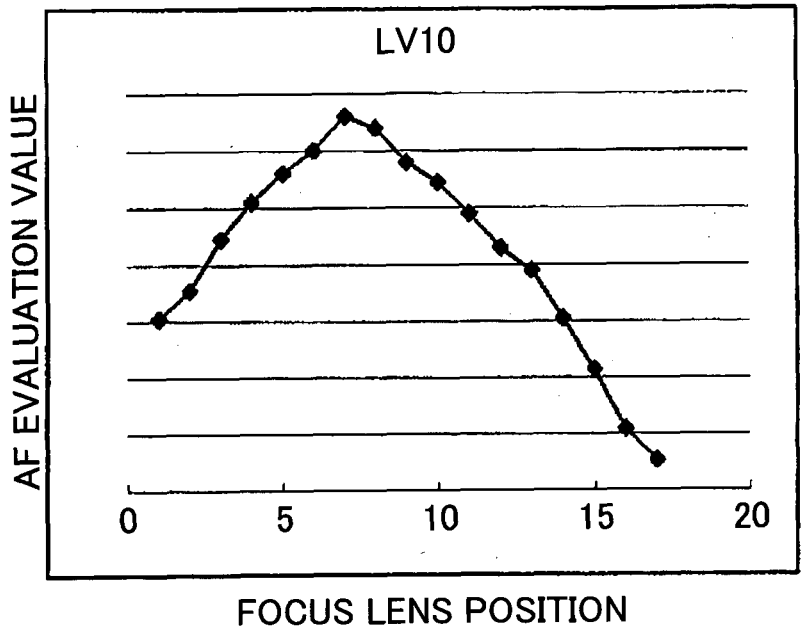
FIG. 11 provides graphs each illustrating AF evaluation values; Graph A illustrates a case in which subject brightness is LV10 and Graph B illustrates a case in which subject brightness is LV8.
Figure 11:
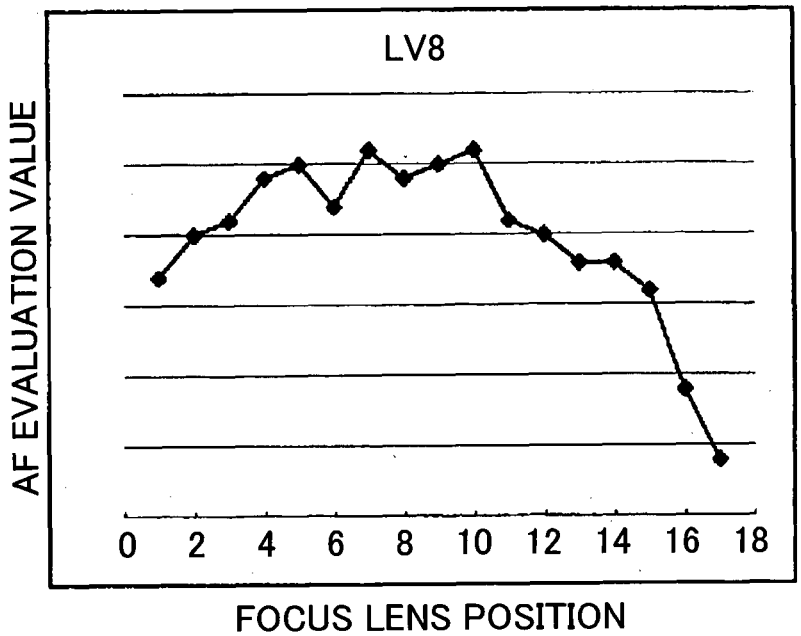
Figure 12:
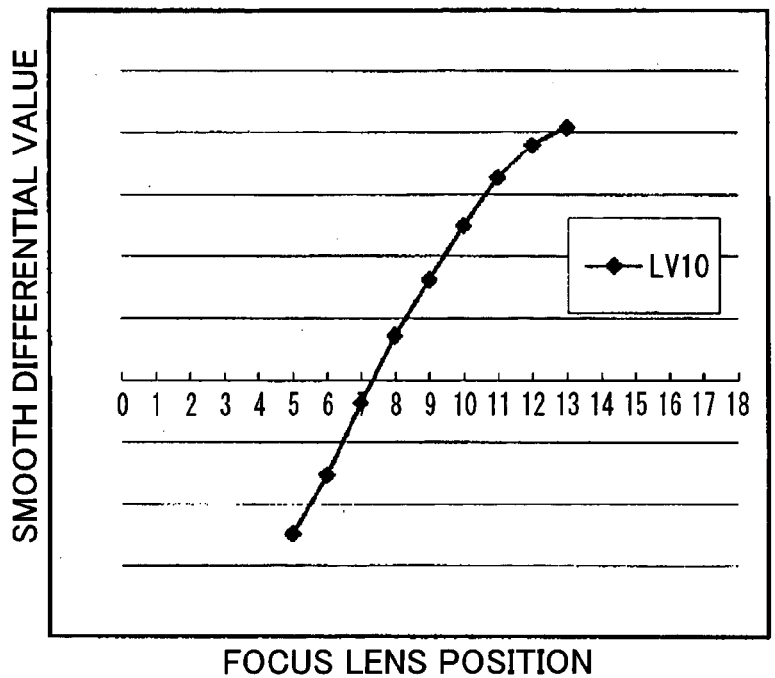
FIG. 12 provides graphs each illustrating a result in which the AF evaluation values in FIG. 11 are smoothly differentiated; Graph A illustrates a case in which subject brightness is LV10 and Graph B illustrates a case in which subject brightness is LV8.
Figure 12:
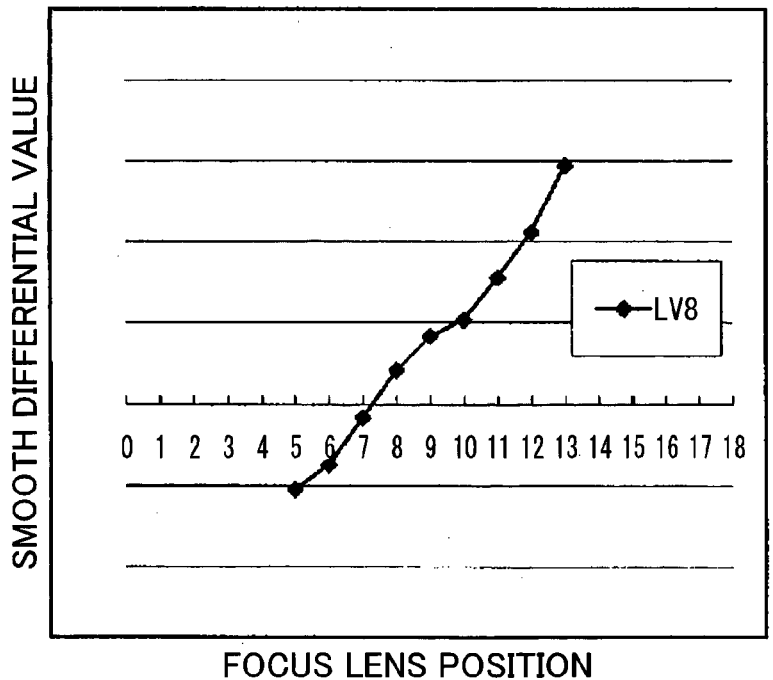

FIGS. 11, 12 illustrate an example of AF evaluation values calculated while being synchronized to a VD signal and an example of smooth differential values calculated based on an AF evaluation value, respectively. FIG. 11 illustrates a change of the AF evaluation values in the AF process. In each of the graphs in FIG. 11, the vertical axis illustrates the size of the AF evaluation value and the horizontal axis illustrates the position of the focus lens 7-2a. Graph A in FIG. 11 illustrates a case in which the subject brightness is LV10 and Graph B in FIG. 11 illustrates a case in which the subject brightness is LV8. Namely, Graph B in FIG. 11 relates to the AF evaluation values calculated under an environment (dark) having a light volume smaller than that of Graph A. Accordingly, in the example illustrated in Graph B in FIG. 11, since the brightness difference between the adjacent pixels is minute, the influence of noise is increased, the AF evaluation value is varied, and a plurality of peaks are generated. If the peak of the AF evaluation values is only one as illustrated in Graph A of FIG. 11, the position of the focus lens in that peak is set as the focus position. On the other hand, if there is plurality of peaks as illustrated in Graph B of FIG. 11, it can not be simply determined which peak is set as the focus position.

FIG. 12 provides graphs each illustrating smooth differential values of the AF evaluation values illustrated in FIG. 11. In each graph, the horizontal axis illustrates the position of the focus lens 7-2a and the vertical axis illustrates the size of the smooth differential value. Graph A of FIG. 12 illustrates smooth differential values calculated according to the AF evaluation values illustrated in Graph A of FIG. 11. Graph B of FIG. 12 illustrates the smooth differential values calculated according to the AF evaluation values illustrated in Graph B of FIG. 11. As illustrated in Graphs A, B of FIG. 12, the smooth differential values are not calculated until the predetermined number of AF evaluation values is calculated. The smooth differential values calculated after calculating the predetermined number of AF evaluation values change with the movement of the focus lens 7-2a, and a reference number turns over in a certain position. This turned over position corresponds to the focus lens in which the AF evaluation value becomes a peak. Namely, the position of the focus lens in which the reference number of the smooth differential value is calculated by the above equation, i.e., the position of the focus lens in which the smooth differential value becomes zero becomes a peak of the AF evaluation values. As described above, by specifying the position of the focus lens where the reference number of the smooth differential value turns over, the focus position can be determined even if there is a plurality of peaks of AF evaluation values.

In FIG. 10, the peak detection process of the AF evaluation value is performed by the smooth differential calculation value (10-5). This is a process which detects the position of the focus lens where the reference number of the smooth differential value turns over. In the peak detection process of the AF evaluation value, it is determined whether or not the peak of the AF evaluation values is detected (10-6). If the peak of the AF evaluation values is not detected (YES in 10-6), it is determined whether or not the present position of the focus lens 7-2a reaches the completion position (10-7). If the position of the focus lens 7-2a does not reach the completion position (YES in 10-7), the flow goes back to the step of 10-1, and the AF evaluation value peak detection process is again performed. On the other hand, if the position of the present focus lens 7-2a reaches the completion position (NO in 10-7), the AF process is completed. If the peak is detected in the peak detection process (NO in 10-6), the AF process is completed.

Going back to FIG. 6, after the AF process (6-3), the focus position determination process is performed (6-4). If the peak of the AF evaluation values is detected in the AF process, the position of the focus lens where the AF evaluation value becomes the peak is determined as the focus position. On the other hand, if the peak of the AF evaluation values is not detected, a predetermined position is determined as the focus position as unenforceability of the AF operation. This predetermined position is a position of the focus lens 7-2a which focuses on the subject separate from about 2.5 m. Finally, a process which moves the focus lens to the focus position is performed (6-5).

According to the above described Embodiment 1, the AF evaluation values are calculated while moving the focus lens to the AF operation start position, and the focused state of the subject is previously confirmed, so that the speed of the subsequent AF operation can be increased. Embodiment 1 is effective for a lens barrel in which the driving range may be large and a DC motor may be used as a driving source.

Embodiment 2

Next, Embodiment 2 of an image device and an imaging method using the imaging device will be described. The AF operation when the shutter button SW1 is pressed is the same as that in Embodiment 1. In FIG. 6, at first, it is determined whether the shutter button SW1 is pressed or not (6-1). If the shutter button SW1 is pressed, the focus lens start scanning process is performed (6-2). The focus lens start scanning process was already described by using the flow chart illustrated in FIG. 7, so the description thereof is omitted. Next, the focus lens speed setting process is performed (7-2). This focus lens speed setting was already described by using the flow chart illustrated in FIG. 8, so the description thereof is also omitted.

Next, the driving of the focus lens is started (7-3). After starting the driving of the focus lens, the output of the VD signal is put on hold (7-4), and the subject image is shot with respect to each VD signal. Then, based on the RGB image data of the subject image, an AF evaluation value is calculated (7-5). Namely, the focus lens is moved to a predetermined direction while being synchronized to the VD signal, and the AF evaluation value is calculated. As described above, by calculating the AF evaluation value with respect to each position of the focus lens, after determining the AF operation start position based on the AF evaluation value, the focus lens can be moved to that position.

Figure 15:
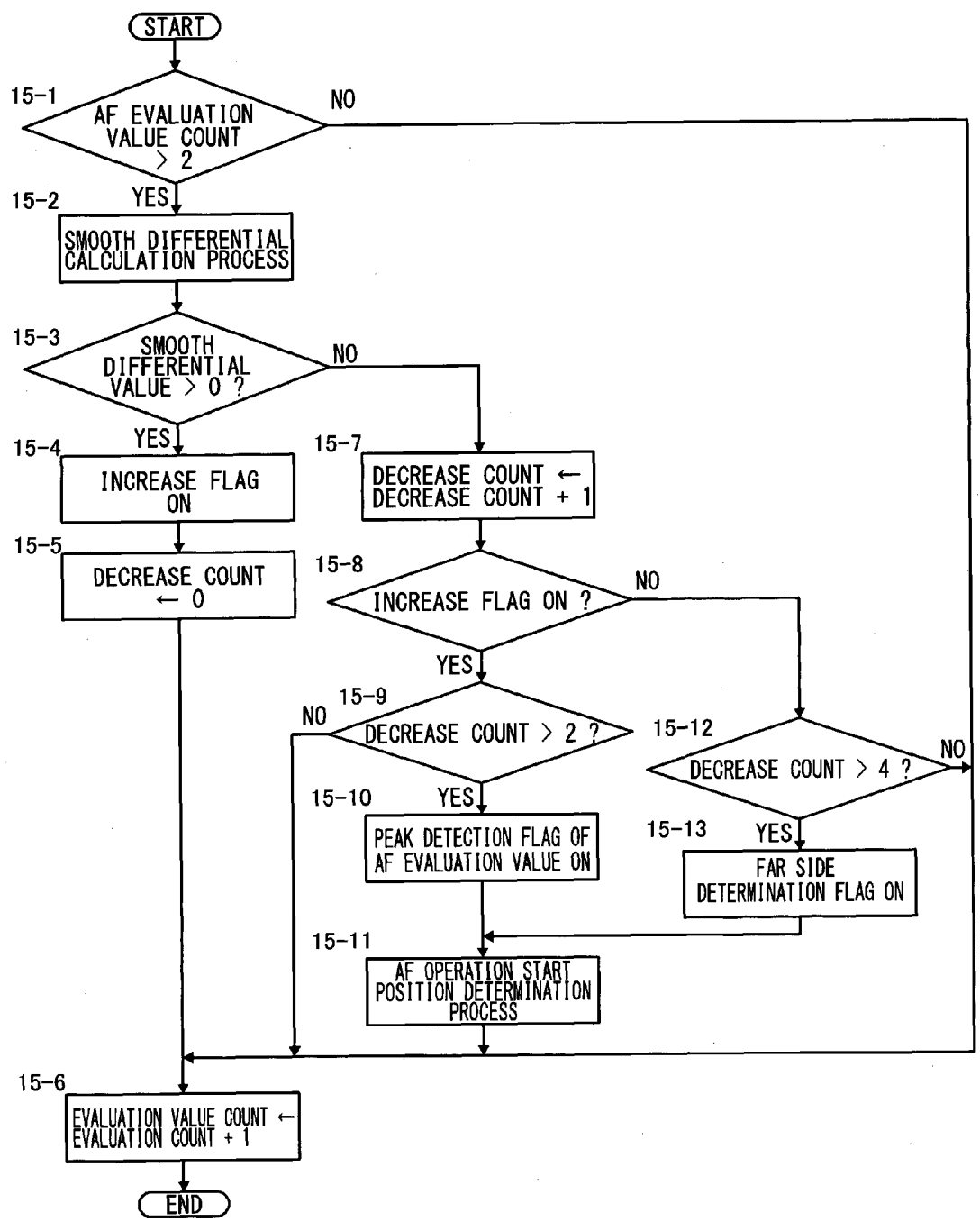
FIG. 15 provides a flow chart of an AF operation start position determination process in Embodiment 2 of the imaging device according to the present invention.

Next, the AF operation start position determination process is performed (7-6). This process is a feature of Embodiment 2. FIG. 15 illustrates a specific example of the AF operation start position determination process (7-6) in Embodiment 2. Referring to FIG. 15, at first, it is determined whether the number of counts of the AF evaluation value is larger than 2 or not (15-1). This is because the number of AF evaluation values required for calculating a smooth differential is at least 3. If the AF evaluation value count is smaller than 2 (NO in 15-1), the process is completed after adding 1 to the evaluation count (15-6). On the other hand, if the AF evaluation value count is larger than 2, the smooth differential calculation is performed (15-2). The smooth differential calculation is as illustrated in Embodiment 1. Next, it is determined whether the smooth differential value is larger than 0 or not (15-3). If the smooth differential value is larger than 0 (YES in 15-3), it is determined that the smooth differential value is increased, and the increased flag becomes ON (15-4). Also, the decrease count at that time is reset to 0 (15-5).

Figure 14:
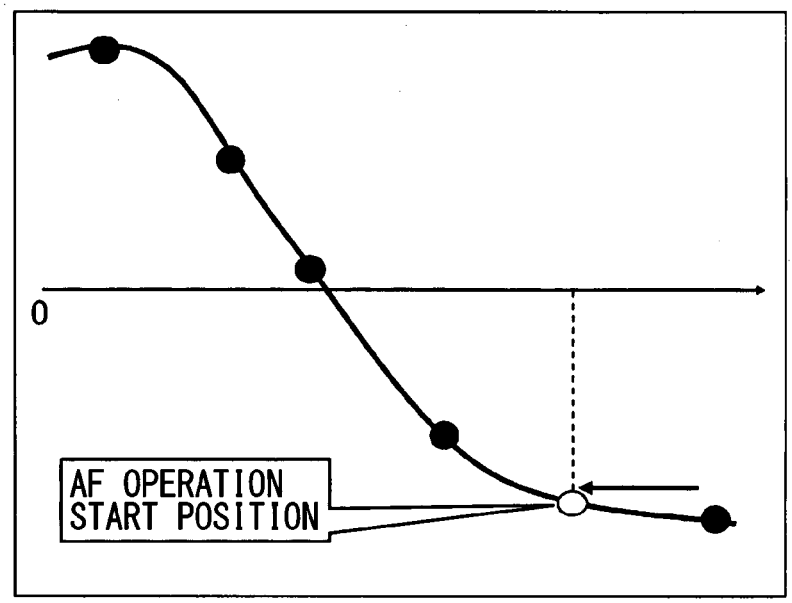
FIG. 14 provides graphs each illustrating a result in which the AF evaluation values in FIG. 13 are smoothly differentiated; Graph A illustrates peak detection of AF evaluation values and Graph B illustrates monotonic decrease of AF evaluation values.
Figure 14:
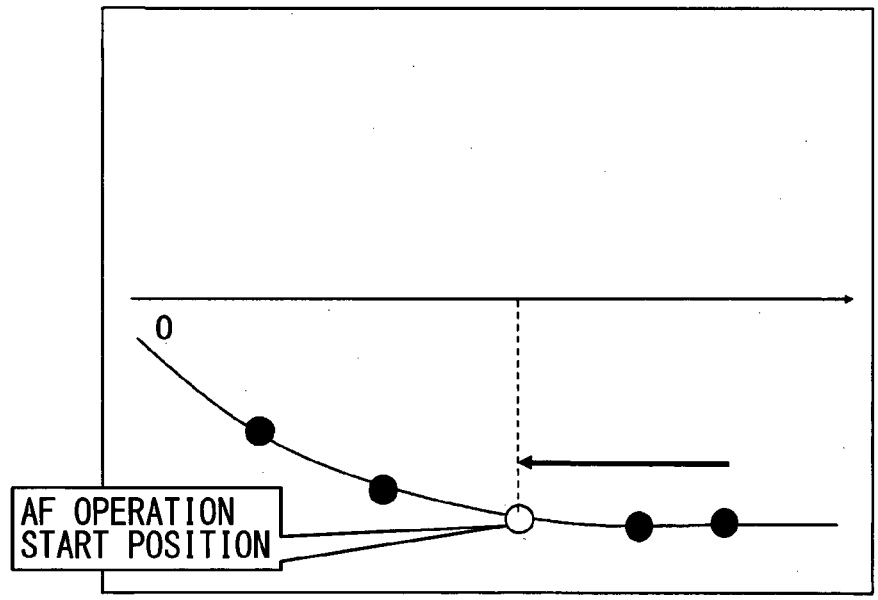

If the smooth differential value is lower than 0 in the above step of 15-3 (NO in 15-3), 1 is added to the decrease count (15-7). Next, it is determined whether the increased flag is ON or not (15-8). If the increased flag is ON, the number of decreased counts is determined (15-9). If the decreased count is larger than 2 (YES in 15-9), the peak detection flag of the AF evaluation value becomes ON (15-10). The wavelength at this time becomes an example illustrated in Graph A of FIG. 14, and the smooth differential value when detecting the peak of the AF evaluation value is changed from the positive value to a negative value, and the reference number turns over. When the increased flag is not ON (NO in 15-8), it is determined whether the decreased count is larger than 4 or not (15-12). If the decreased count is larger than 4 (YES in 15-12), it is determined that the focus position to the subject has already been passed through, and the far side determination flag becomes ON (15-13). This determination is based on a property that the smooth differential value after passing through the subject position is always negative as illustrated in Graph B of FIG. 14. When the peak detection flag or the far side determination flag of the AF evaluation value is ON, the AF operation start position determination process is performed (15-11). Regarding the AF operation start position determination process, when the peak detection flag of the AF evaluation value is. ON, the position which calculates the last AF evaluation value is set to the AF operation start position. When the far side determination flag is ON, the position which calculates the last AF evaluation value but one is set to the AF operation start position. A difference from Embodiment 1 is that the smooth differential value is used instead of the AF evaluation value in the AF operation start position determination process. Therefore, the AF operation can be performed with high accuracy.

Going back to FIG. 7, if the AF operation start position is determined (YES in 7-8) in a state in which the present position does not reach the temporal position yet (YES in 7-7), i.e., the peak detection flag of the AF evaluation value is ON or the far side determination flag is ON, the movement process to the AF operation start position (7-9) is performed, and the focus lens start scanning process is completed. In the movement process to the AF operation start position (7-9), while the focus lens 7-2a still moves in the beginning of the process, the stop operation of the focus lens 7-2a is performed, and the movement of the focus lens 7-2a toward the AF operation start position is again started. On the other hand, while the focus lens 7-2a stops in the beginning of the process, the movement of the focus lens 7-2a to the AF operation start position is started. When the AF operation start position is not determined (NO in 7-8), the VD signal is again put on hold, the AF evaluation value is calculated, and the AF operation start position determination process is repeated. In the above step of 7-7, if the present position of the focus lens=the temporal position of the focus lens (NO in 7-7), in the movement process to the AF operation start position (7-9), the temporal position is set as the AF operation start position, and the focus lens start scanning process is completed. The above-described focus lens start scanning process is the feature of Embodiment 2.

If the focus lens start scanning process is completed, the AF process (6-3), the focus position determination process (6-4) and the movement process to the focus position of the focus lens (6-5) are performed, and the autofocus adjustment operation by the imaging device is completed. The specific examples of the AF process (6-3), the focus position determination process (6-4), and the movement process to the focus position of the focus lens (6-5) are the same as those in Embodiment 1, so the detailed descriptions thereof are omitted.

Embodiment 3

Embodiment 3 of an imaging device and an imaging method using the imaging device will be described. The AF operation when the shutter button SW1 is pressed is the same as that in Embodiment 2. In FIG. 6, at first, it is determined whether the shutter button SW 1 is pressed or not (6-1). If the shutter button SW1 is pressed, the focus lens start scanning process is performed (6-2). This focus lens start scanning process is a feature of the present embodiment. Hereinafter, this focus lens start scanning process will be described by using the flow chart in FIG. 16.

Figure 16:
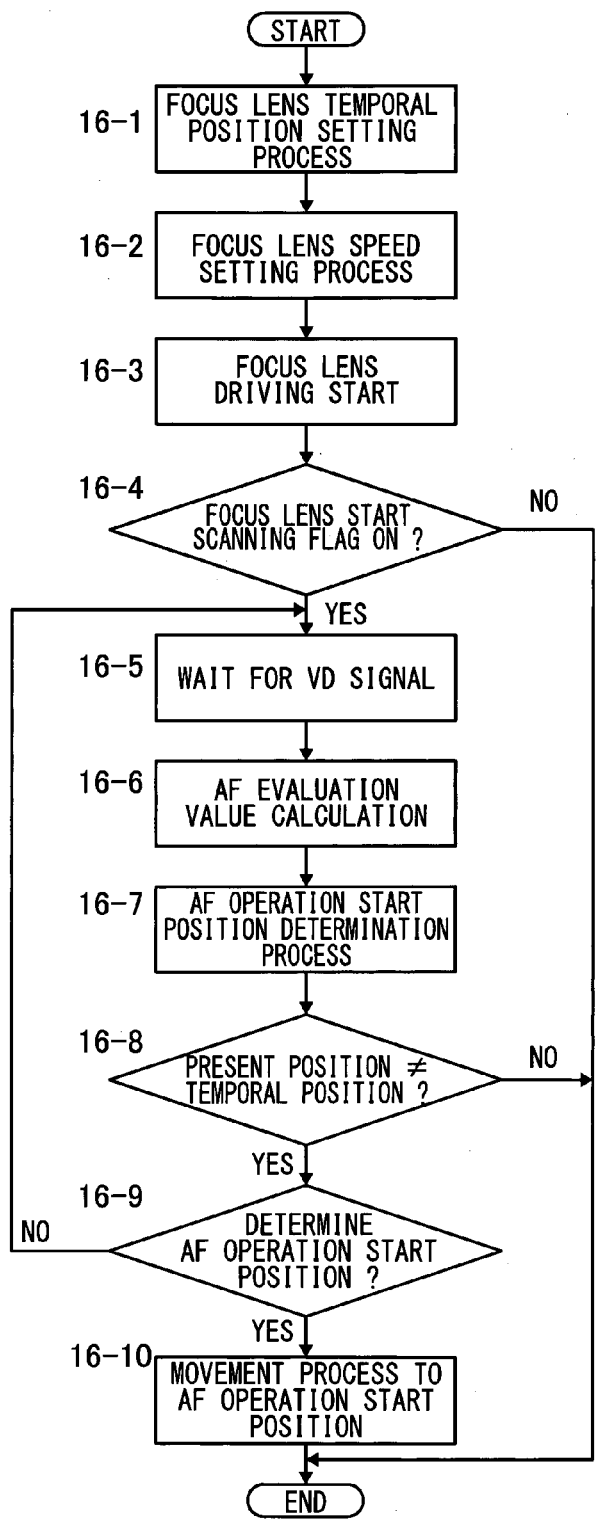
FIG. 16 provides a flow chart of a focus lens start scanning process in Embodiment 3 of the imaging device according to the present invention.

Referring to FIG. 16, in the focus lens start scanning process, at first, the temporal position setting process of the focus lens is performed (16-1). The temporal position is a temporal position of the focus lens 7-2a in the previous step which determines the position of the focus lens 7-2a starting the AF operation (AF operation start position). When performing the subsequent AF process, the direction which is not affected by the backlash of the focus lens 7-2a or the direction which does not require the removing of the backlash is preferable as the movement direction of the focus lens 7-2a. Since the movement direction of the focus lens 7-2a in the present embodiment is a direction toward the infinity side from the close range side, the driving direction of the focus lens 7-2a in the AF operation is close range side→infinite distance side direction. Accordingly, it is necessary to locate the temporal position on the close range side, so that the temporal position is set to the position of the focus lens corresponding to the position of 30 cm, which is the position of the close range side in the present embodiment.

Next, the focus lens speed setting process is performed (16-2). In the focus lens speed setting process, the focus lens speed setting is performed according to the calculation intervals of the AF evaluation values. In this focus lens speed setting process, the movement range and the movement amount of the focus lens 7-2a are confirmed based on the difference between the temporal position and the present position. Determination as to whether or not the speed setting of the focus lens and the subsequent focus lens start scanning are performed is a feature of the present embodiment. This feature will be described by using the flow chart in FIG. 17.

Figure 17:
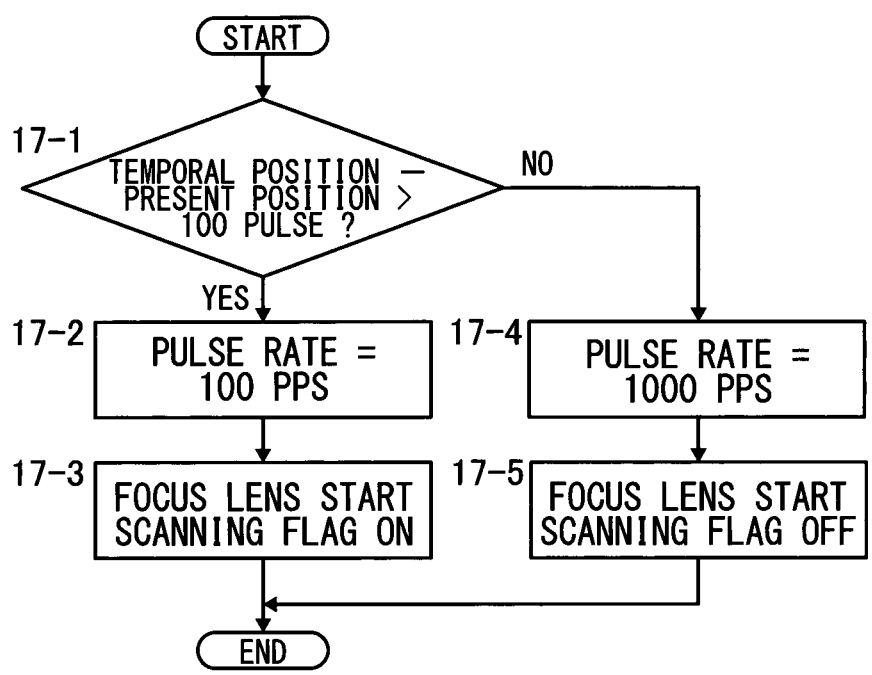
FIG. 17 provides a flow chart of a focus lens speed setting process in Embodiment 3.

Referring to FIG. 17, at first, a difference between the temporal position and the present position of the focus lens is determined (17-1). If this difference is larger than the distance of 100 pulses, for example, (YES in 17-1), the pulse rate is set to 100 pps (17-3), and the focus lens start scanning flag becomes ON (17-3). On the other hand, if the above difference is less than 100 pulses (NO in 17-1), the pulse rate is set to 1000 pps (17-4), and the focus lens start scanning flag becomes OFF (17-5). Namely, in the present embodiment, if the difference is larger than a predetermined value (YES in 17-1), the AF evaluation value is calculated by driving the focus lens at a low pulse rate, i.e., a low speed. On the other hand, if the above difference is lower than a predetermined value (NO in 17-1), the number of AF evaluation values is small and there is nothing to be gained by performing start scanning. Consequently, the start scanning is not performed, and the focus lens is moved to the temporal position at a high pulse rate, i.e., a high speed. The above operation is a feature of the present embodiment. When performing the focus lens start scanning, the speed of the focus lens is set to 100 pps; however, this can be changed in accordance with the focal length or the shooting mode similar to Embodiments 1, 2. Regarding the setting value of the high pulse rate when the focus lens start scanning is not conducted, the value is not limited to 1000 pps, and it can be changed.

Going back to FIG. 16, after the focus lens speed setting process, the driving of the focus lens is started (16-3). After the driving of the focus lens is started, if the focus lens start scanning flag is ON (YES in 16-4), the VD signal is put on hold (16-5), and the subject image is shot with respect to each VD signal. Based on the RGB image data of the subject image, an AF evaluation value is calculated (16-6). As described above, by calculating the AF evaluation value with respect to each position of the focus lens, after the AF operation start position is determined based on the AF evaluation value, the focus lens can be moved to that position. On the other hand, if the focus lens start scanning flag is OFF (NO in 16-4), the flow moves to the movement process (16-10) to the AF operation start position. In this case, in the movement process (16-10) to the AF operation start position, the lens position set in the temporal position setting process (16-1) is set as the AF operation start position, and the focus lens start scanning process is completed.

If the AF evaluation value is calculated (16-6), next, the AF operation start position determination process is performed (16-7). The AF operation start position determination process (16-7) is the same as the operation of the flow chart illustrated in FIG. 15 described in Embodiment 2, so the description thereof is omitted.

Referring to FIG. 16, after the AF operation start position determination process (16-7), it is determined whether or not the present position reaches the temporal position (16-4). If the present position does not reach the temporal position yet (YES in 16-8), the AF operation start position determination process is performed (16-9). In this case, if the AF operation start position is determined (YES in 16-9), i.e., the peak detection flag is ON, or the far side determination flag is ON, the movement process to the AF operation start position (16-10) is performed, and the focus lens start scanning process is completed. In the movement process to the AF operation start position (16-10), while the focus lens 7-2a still moves in the beginning of the process, the stop operation of the focus lens 7-2a is performed, and the movement of the focus lens 7-2a to the AF operation start position is started. On the other hand, while the focus lens 7-2a stops in the beginning of the process, the movement of the focus lens 7-2a to the AF operation start position is started. If the AF operation start position is not determined (NO in 16-9), the VD signal is again put on hold (16-5), the AF evaluation value is calculated and the AF operation start position determination process is repeated. If the present position of the focus lens 7-2a=the temporal position of the focus lens (NO in 16-8), in the movement process to the AF operation start position (16-10), the temporal position, i.e., the lens position set in the temporal position setting process (16-1) is set to the AF operation start position, and the focus lens start scanning process is completed.

If the focus lens start scanning process illustrated in FIG. 16 (step 6-2 in FIG. 6) is completed, the AF process illustrated in FIG. 6 is performed (6-3). The specific example of the AF process is the same as the operation of the already-described flow chart in FIG. 10. Namely, at first, a process which waits for a VD signal until the falling edge of the VD signal is detected is performed (10-1). After detecting the falling edge of the VD signal, the focus motor 7-2b is driven according to the number of predetermined pulses, and the focus lens 7-2a is moved (10-2). After the focus lens 7-2a is moved, the picture signal is obtained, and the AF evaluation value is calculated based on the RGB image data according to the picture signal (10-3). Next, by using this AF evaluation value, the smooth differential calculation process (10-4) is performed. The smooth differential calculation process of the AF evaluation value is the same as the calculation process described in Embodiment 1.

The peak detection process of the AF evaluation values (10-5) is conducted by the smooth differential calculation value. This is a process which detects the position of the focus lens in which the reference number of the smooth differential value turns over. In the peak detection process of the AF evaluation value, it is determined whether or not the peak of the AF evaluation values is detected (10-6). If the peak of the AF evaluation values is not detected (YES in 10-6), it is determined whether the present position of the focus lens 7-2a reaches the completion position or not (10-7). If the present position of the focus lens 7-2a does not reach the completion position (YES in 10-7), the flow goes back to the step of 10-1, and the peak detection process of the AF evaluation values is again performed. On the other hand, if the present position of the focus lens 7-2a reaches the completion position (NO in 10-7), the AF process is completed. If the peak is detected in the peak detection process (10-6) (NO in 10-6), the AF process is completed.

Going back to FIG. 6, the focus position determination process is performed (6-4). If the peak of the AF evaluation values is detected in the AF process, the position of the focus lens in which the AF evaluation value becomes the peak is determined as the focus position. On the other hand, if the peak of the AF evaluation values is not detected, as unenforceability of the AF operation, a predetermined position is determined as the focus position. This predetermined position is a position of the focus lens 7-2a which focuses on a subject separate about 2.5 m. Finally, the process which moves the focus lens to the focus position is performed (6-5).

Embodiment 4

Next, Embodiment 4 of an imaging device and an imaging method using the imaging device will be described. The AF process when the shutter button SW1 is pressed is the same as that in each embodiment. In FIG. 6, a focus lens start scanning process which is performed by pressing the shutter button SW1 is a feature of the present embodiment. Hereinafter, the focus lens start scanning process will be described by using the flow chart in FIG. 18.

Figure 18:
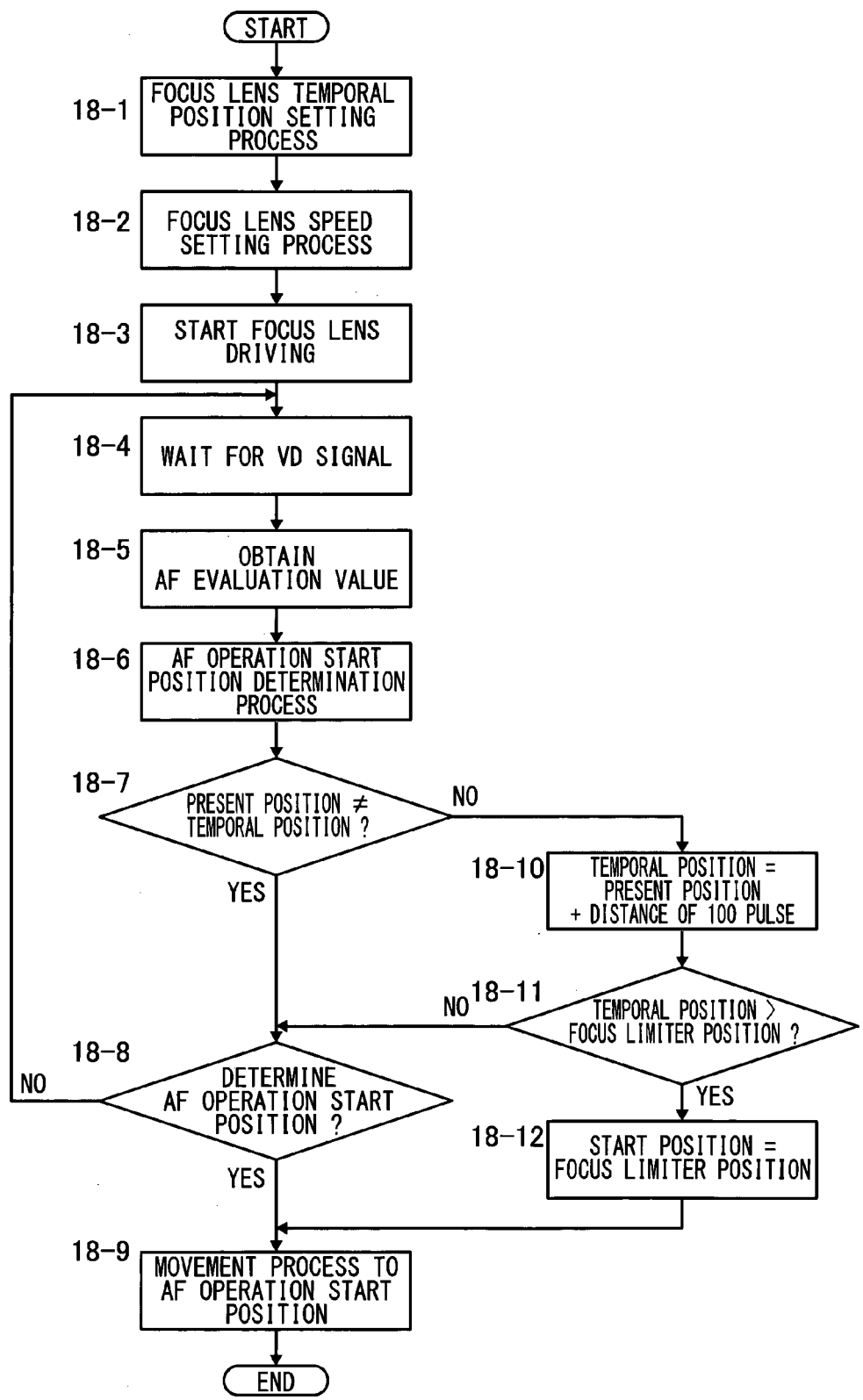
FIG. 18 provides a flow chart of a focus lens start scanning process in Embodiment 4 of the imaging device according to the present invention.

Referring now to FIG. 18, in the focus lens start scanning process, at first, a temporal position setting process of a focus lens is performed (18-1). The temporal position is a position of the focus lens 7-2a in the previous step which determines the position (AF operation start position) of the focus lens 7-2a starting the AF operation, and a predetermined operation position. When performing the AF operation, a direction which is not affected by the backlash of the driving mechanism of the focus lens 7-2a and a direction which does not require the removing of the backlash is preferable as the movement direction of the focus lens 7-2a. Since the movement direction of the focus lens 7-2a in this embodiment is a direction toward the infinity side from the close range side, the driving direction of the focus lens 7-2a in the AF process is the close range side→the infinity side direction. Accordingly, it is necessary to place the temporal position to the close range side, so that the temporal position is set to the position of the focus lens corresponding to the position of 30 cm which is the position of the close range side.

Figure 19:
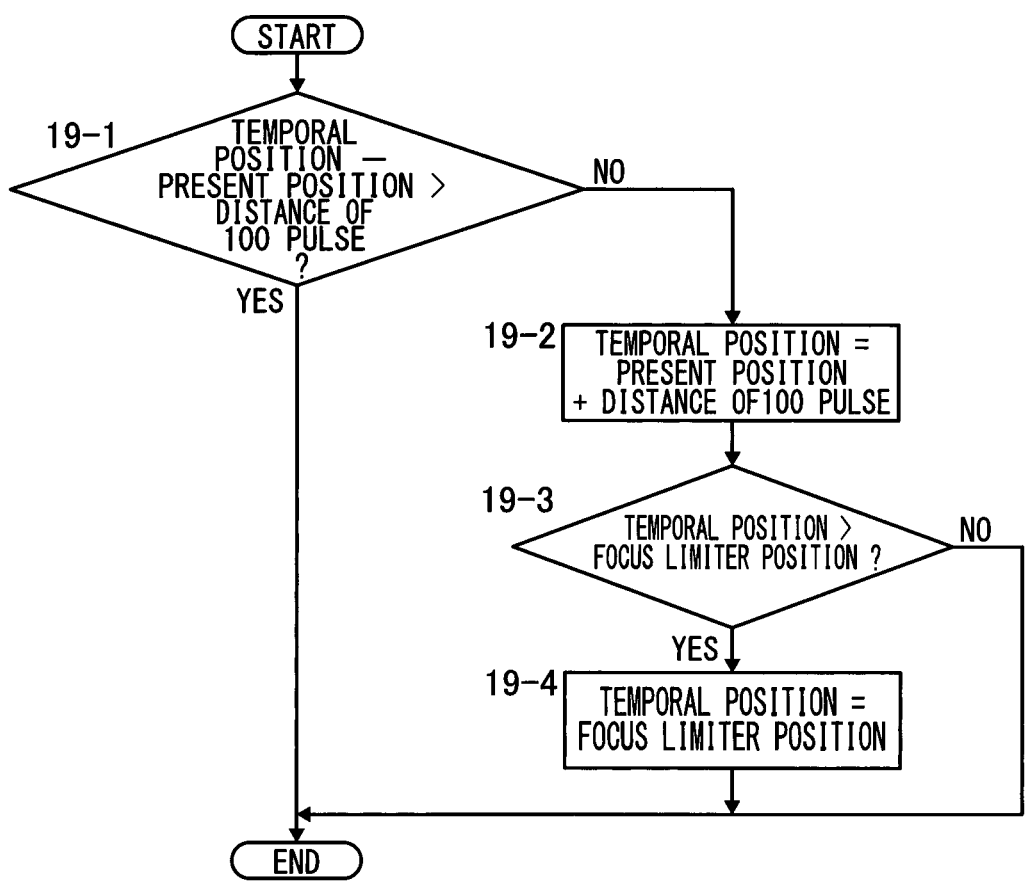
FIG. 19 provides a flow chart of a focus lens temporal position setting process in Embodiment 4.

FIG. 19 illustrates the flow chart of the focus lens temporal position setting process in the present embodiment. In FIG. 19, if the difference between the present position and the temporal position is larger than the distance of 100 pulses (YES in 19-1), the process is completed. If the difference between the present position and the temporal position is less than the distance of 100 pulses (NO in 19-1), the present position+the position of the distance of 100 pulses is the temporal position (19-2). If the temporal position exceeds the closest position (hereinafter, focus limiter position) (YES in 19-3), the focus limiter position is set to the temporal position, and the process is completed (19-4). If the temporal position is lower than the focus limiter position (NO in 19-3), the temporal position is left and the process is completed (19-4). Regarding this focus lens temporal position setting process, if the present position is located near 30 cm, which is the close range side, the focus lens start scanning range is decreased, and the calculation of the AF evaluation values becomes difficult. Therefore, the temporal position is shifted to the close range side, so as to perform the focus lens start scanning. Thereby, the number of AF evaluation values required in the focus lens start scanning is ensured, so that the AF operation start position can be determined. In the step of 19-1, it is assumed that the difference between the present position and the temporal position is larger than the distance of 100 pulses. However, the difference is not limited thereto because it is changed according to the focal length or the specs of the imaging device.

Next, the focus lens speed setting process (18-2) is performed. In the focus lens speed setting process, according to the calculation intervals of the AF evaluation values, the speed of the focus lens is set. Since the frame rate in the finder mode of the imaging device in this embodiment is 30 fps, the focus speed required for calculating the AF evaluation values at $\frac{1}{30}$ sec intervals is set. This process is illustrated in. FIG. 8, and is the same as that in the previous embodiments, so the description thereof is omitted.

Next, the driving of the focus lens is started (18-3). After the start of the driving of the focus lens, the output of the VD signal is put on hold (18-4), and the subject image is shot with respect to each VD signal. According to the RGB image data of the subject image, the AF evaluation values are calculated (18-5). As described above, by calculating the AF evaluation value with respect to each position of the focus lens, after determining the AF operation start position based on the AF evaluation values, the focus lens can be moved to that position.

Next, the AF operation start position determination process is performed (18-6). This process is the same as the AF operation start position determination process in Embodiment 2, and is performed in accordance with the flow chart illustrated in FIG. 15. Therefore, the specific description of the AF operation start position determination process is omitted.

Going back to FIG. 18, if the present position does not reach the completion position yet (YES in 18-7) and the AF operation start position is determined (YES in 18-8), namely, if the peak detection flag is ON or the monotonic decrease flag is ON, the movement process to the AF operation start position (18-9) is performed, and the process is completed. In the movement process to the AF operation start position (18-9), while the focus lens 7-2a still moves in the beginning of the process, the stop operation of the focus lens 7-2a is performed, and the movement of the focus lens 7-2a toward the AF operation start position is again started. On the other hand, while the focus lens 7-2a stops in the beginning of the process, the movement of the focus lens 7-2a to the AF operation start position is started. If the AF operation start position is not determined (NO in 18-8), the VD signal is again put on hold, the AF evaluation values are calculated, and the AF operation start position determination process is repeated. If the focus lens 7-2a moves to the temporal position (NO in 18-7), the present position+the position of the distance of 100 pulses is reset as the temporal position (18-10).

If the temporal position is lower than the focus limiter position (NO in 18-11), it is determined whether the AF operation start position is determined or not (18-8). If the temporal position exceeds the focus limiter position (YES in 18-11), the focus limiter position is reset to the AF operation start position (18-12), and the movement process to the AF operation start position (18-9) is performed. As described above, until the AF operation start position is determined, the focus lens start scanning can be continuously performed, and the focus state to the subject can be confirmed before the AF operation. In the movement process to the AF operation start position (18-9), the focus lens is moved to the set AF operation start position, and the focus lens start scanning process is completed. As described above, the focus lens start scanning process is a feature of Embodiment 4.

If the focus lens start scanning process is completed, the AF process (6-3), the focus position determination process (6-4), and the movement process to the focus position of the focus lens (6-5) are performed, and the AF operation by the imaging device is completed. The specific examples of the AF process (6-3), the focus position determination process (6-4), and the movement process to the focus position of the focus lens (6-5) are the same as those described in Embodiment 1, so those descriptions are omitted.

According to the embodiments of the present invention, by performing the AF operation while changing the movement speed, the movement area and the like of the lens, the imaging device and the imaging method which can perform the AF operation at high speed can be provided. According to the embodiments of the present invention, by flexibly changing the movement speed of the lens corresponding to various photographing conditions, the imaging device and the imaging method which can perform the AF operation at high speed can be provided.

The imaging device and the imaging method according to the embodiments of the present invention can be applicable to not only a digital camera but also a camera incorporated into a cell phone and various types of cameras. According to the imaging device and the imaging method of the embodiments of the present invention, since a time required for autofocusing can be reduced, imaging at a desired imaging timing can be easily carried out.

According to the embodiments of the present invention, since the autofocus detector calculates AF evaluation values according to image data, and the AF operation start position determination unit determines an AF operation start position at the same time that the lens movement unit starts the driving of the photographing lens toward the AF operation start position, the AF operation can be performed at high speed.

Although the embodiments of the present invention have been described above, the present invention is not limited thereto. It should be appreciated that variations may be made in the embodiments described by persons skilled in the art without departing from the scope of the present invention.

The present application is based on and claims priority from Japanese Patent Application No. 2009-274606, filed on Dec. 2, 2009, and Japanese Patent Application No. 2010-225096, filed on Oct. 4, 2010, the disclosures of which are hereby incorporated by reference in their entirety.

The invention claimed is:

1. An imaging device, comprising:
   an imaging lens which obtains an optical image of a subject;
   an imaging element which receives from a subject light passing through the imaging lens;
   a focus position determination unit which determines a focus position of the imaging lens according to image data obtained from the imaging element; and
   a lens movement unit which moves the imaging lens;
   the focus position determination unit sets a predetermined operation start position which starts a focus detection operation,
   the focus position determination unit including an AF operation start position determination unit configured to calculate an AF evaluation value according to the image data, and determine an AF operation start position according to the AF evaluation value when the lens movement unit drives the imaging lens to the predetermined operation start position, and
   the focus position determination unit is configured to detect a peak or monotonic decrease of the AF evaluation value, and the AF operation start position when the peak is detected differs from the AF operation start position when the monotonic decrease is detected.

2. The imaging device according to claim 1, wherein the AF operation start position determination unit sets the AF operation start position to be the predetermined operation start position when a present lens position reaches the predetermined operation start position and no AF operation start position is determined.

3. The imaging device according to claim 2, wherein the AF operation start position determination unit shifts the predetermined operation start position to a direction separate from a present position of the imaging lens when the predetermined operation start position is close to a limit position of a movement range of the imaging lens beyond which the imaging lens cannot move.

4. The imaging device according to claim 3, wherein the AF operation start position determination unit shifts the predetermined operation start position to a close range side when the limit position is on the close range side.

5. The imaging device according to claim 1, wherein a movement direction of the imaging lens in driving to the AF operation start position by the lens movement unit is a direction which is not affected by a backlash of a driving mechanism of the lens included in the lens movement unit.

6. The imaging device according to claim 1, wherein the AF operation start position determination unit determines the AF operation start position by determining an increase and decrease of the AF evaluation value.

7. The imaging device according to claim 1, wherein the AF operation start position determination unit determines the AF operation start position according to a smooth differential calculation result calculated based on the AF evaluation value.

8. The imaging device according to claim 1, wherein the AF operation start position determination unit changes a movement speed of the imaging lens by the lens movement unit according to a predetermined condition.

9. The imaging device according to claim 8, wherein the predetermined condition is a condition which is defined by a present position of the imaging lens.

10. The imaging device according to claim 8, wherein the predetermined condition is a condition which is defined by a photographing mode of the imaging device.

11. The imaging device according to claim 8, wherein the predetermined condition is a condition which is defined by a focal length of the imaging lens.

12. The imaging device according to claim 1, wherein the predetermined operation start position is a previous AF operation start position.

13. The imaging device according to claim 1, wherein the AF operation start position determination unit calculates a plurality of AF evaluation values according to the image data when the lens movement unit drives the imaging lens.

14. The imaging device according to claim 1, wherein the AF operation start position determination unit is configured to determine the AF operation start position according to the AF evaluation value when the lens movement unit drives the imaging lens to the predetermined operation start position before a start of an AF process.

15. The imaging device according to claim 14, wherein the AF process occurs before a start of a focus position determination process.

16. The imaging device according to claim 1, wherein the focus position determination unit is configured to set a peak detection flag and a monotonic decrease flag, to set a position where a last AF evaluation value is calculated to the AF operation start position when the peak flag of the AF evaluation value is on, and to set a previous position to the position where the last AF evaluation value is calculated to the AF operation start position when the monotonic decrease flag of the AF evaluation value is on.

17. An imaging method, comprising:
receiving an optical image of a subject and images the optical image of the subject;
determining a focus position of an imaging lens according to image data obtained in the receiving; and
moving the imaging lens;
the determining including setting a predetermined operation start position which starts a focus detection operation, calculating an AF evaluation value based on the image data, detecting a peak or monotonic decrease of the AF evaluation value, and determining an AF operation start position based on the AF evaluation value when moving the imaging lens to the predetermined operation start position, and the AF operation start position when the peak is detected differs from the AF operation start position when the monotonic decrease is detected.

18. An imaging device, comprising:
an imaging lens which obtains an optical image of a subject;
an imaging sensor which receives from a subject light passing through the imaging lens;
circuitry configured to determine a focus position of the imaging lens according to image data obtained from the imaging sensor; and
a motor which moves the imaging lens;
the circuitry sets a predetermined operation start position which starts a focus detection operation,
the circuitry is configured to calculate an AF evaluation value according to the image data, and to determine an AF operation start position according to the AF evaluation value when the motor drives the imaging lens to the predetermined operation start position, and
the circuitry is configured to detect a peak or monotonic decrease of the AF evaluation value, and the AF operation start position when the peak is detected differs from the AF operation start position when the monotonic decrease is detected.

* * * * *